US010878313B2

(12) United States Patent
Augustine et al.

(10) Patent No.: US 10,878,313 B2
(45) Date of Patent: Dec. 29, 2020

(54) POST SYNAPTIC POTENTIAL-BASED LEARNING RULE

(71) Applicant: Intel Corporation, Santa Clara, CA (US)

(72) Inventors: Charles Augustine, Portland, OR (US); Somnath Paul, Portland, OR (US); Sadique Ul Ameen Sheik, La Jolaa, CA (US); Muhammad M. Khellah, Tigard, OR (US)

(73) Assignee: INTEL CORPORATION, Santa Clara, CA (US)

( * ) Notice: Subject to any disclaimer, the term of this patent is extended or adjusted under 35 U.S.C. 154(b) by 832 days.

(21) Appl. No.: 15/584,510

(22) Filed: May 2, 2017

(65) Prior Publication Data
US 2018/0322384 A1 Nov. 8, 2018

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
CPC .............................. G06N 3/063; G06N 3/049
See application file for complete search history.

(56) References Cited

U.S. PATENT DOCUMENTS

2014/0052679 A1* 2/2014 Sinyavskiy .............. G06N 3/10
706/25
2014/0317035 A1* 10/2014 Szatmary ............... G06N 3/049
706/27

OTHER PUBLICATIONS

Bako et al., Hardware spiking neural networks: parallel implementations using FPGAs, Proceedings of the 8th WSEAS Int. Conference on Automatic Control, Modeling and Simulation, Prague, Czech Republic, Mar. 12-14, 2006 (pp. 261-266) (Year: 2006).*
Nere et al., Bridging the Semantic Gap: Emulating Biological Neuronal Behaviors with Simple Digital Neurons, IEEE, 2013, Total Pages: 12 (Year: 2013).*
Arthur et al., Building Block of a Programmable Neuromorphic Substrate: A Digital Neurosynaptic Core, WCCI 2012 IEEE World Congress on Computational Intelligence, Jun. 10-15, 2012, Total Pages: 8 (Year: 2012).*

(Continued)

*Primary Examiner* — Alan Chen
(74) *Attorney, Agent, or Firm* — Alliance IP, LLC

(57) ABSTRACT

A spike sent from a first artificial neuron in a spiking neural network (SNN) to a second artificial neuron in the SNN is identified, with the spike sent over a particular artificial synapse in the SNN. The membrane potential of the second artificial neuron at a particular time step, corresponding to sending of the spike, is compared to a threshold potential, where the threshold potential is set lower than a firing potential of the second artificial neuron. A change to the synaptic weight of the particular artificial synapse is determined based on the spike, where the synaptic weight is to be decreased if the membrane potential of the second artificial neuron is lower than the threshold potential at the particular time step and the synaptic weight is to be increased if the membrane potential of the second artificial neuron is higher than the threshold potential at the particular time step.

19 Claims, 22 Drawing Sheets

(56) References Cited

OTHER PUBLICATIONS

Qiao et al., A reconfigurable on-line learning spiking neuromorphic processor comprising 256 neurons and 128K synapses, Frontiers of Neuroscience, vol. 9, Article 141, Apr. 2015, pp. 1-17 (Year: 2015).*

Habenschuss, Stefan, et al., "Homeostatic plasticity in Bayesian spiking networks as Expectation Maximization with posterior constraints", Advances in Neural Information Processing Systems, 2012, pp. 773-781.

Masquelier, Timothee, et al., "Competitive STDP-Based Spike Pattern Learning", Neural Computation, vol. 21, No. 5, 2009, pp. 1259-1276.

Seo, Jae-sun, et al., "A 45nm CMOS neuromorphic chip with a scalable architecture for learning in networks of spiking neurons", Proceedings of the Custom Integrated Circuits Conference, Sep. 2011, 5 pages.

* cited by examiner

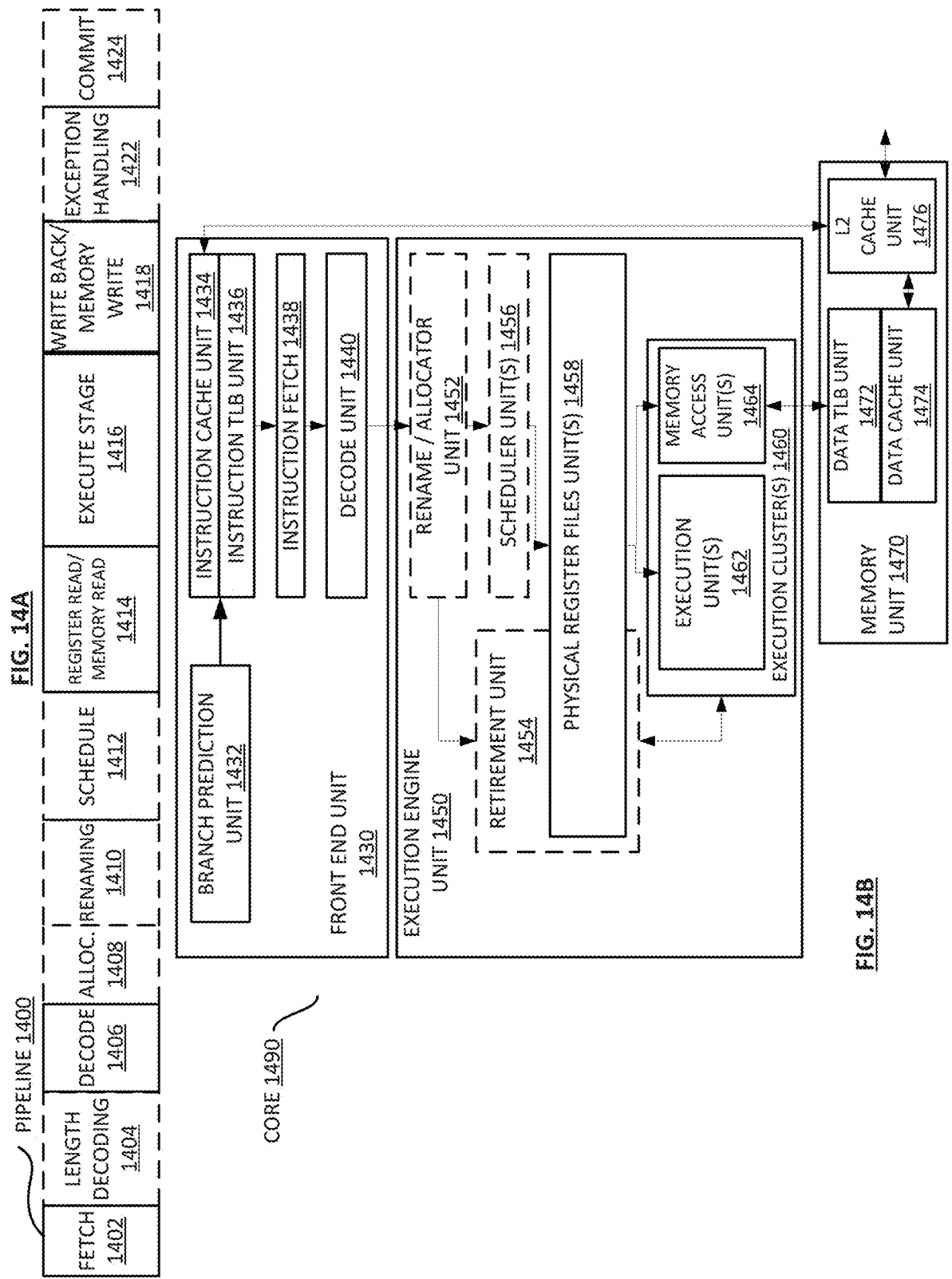

POST SYNAPTIC POTENTIAL-BASED LEARNING RULE

TECHNICAL FIELD

This disclosure relates in general to the field of computer systems and, more particularly, to neuromorphic computing.

BACKGROUND

Artificial neural networks (or ANNs or simply "neural networks") are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs), Spiking Neural Networks (SNNs), and Deep Belief Networks (DBNs) are just a few examples of computation paradigms that employ neural network-based algorithms.

BRIEF DESCRIPTION OF THE DRAWINGS

FIG. 14A is a block diagram illustrating both an exemplary in-order pipeline and an exemplary register renaming, out-of-order issue/execution pipeline according to embodiments of the invention.

FIG. 14B is a block diagram illustrating both an exemplary embodiment of an in-order architecture core and an exemplary register renaming, out-of-order issue/execution architecture core to be included in a processor according to embodiments of the invention;

Like reference numbers and designations in the various drawings indicate like elements.

DETAILED DESCRIPTION OF EXAMPLE EMBODIMENTS

Figure 1:
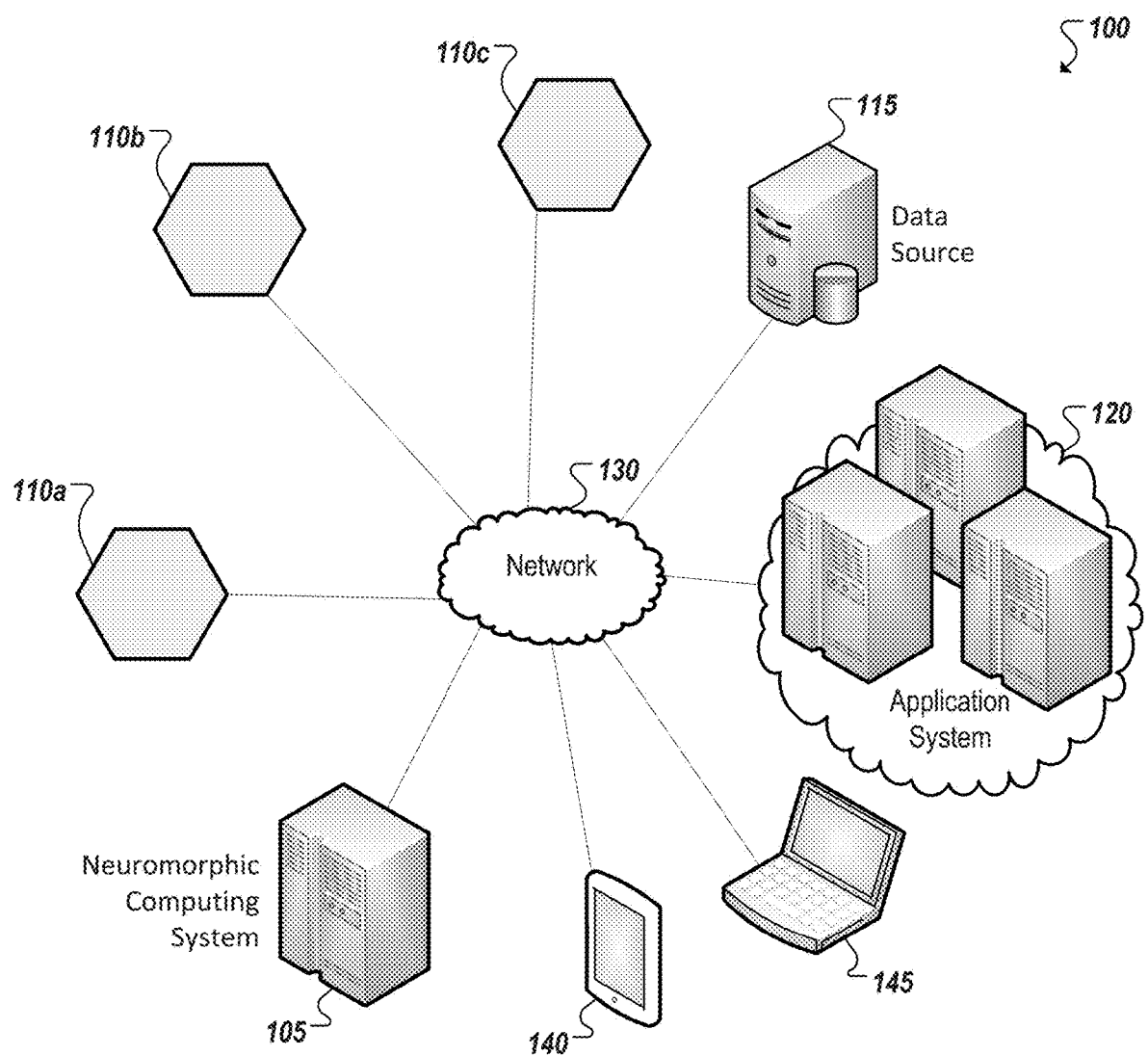
FIG. 1 illustrates an embodiment of a system including a neuromorphic computing systems.

FIG. 1 illustrates an example computing system including a neuromorphic computing system 105, which may accept as inputs, data from one or a variety of sources. For instance, sources may include sensor devices (e.g., 110a-c). Such devices 110a-c may detect and/or measure attributes of an environment and generate sensor data describing or capturing characteristics of the environment. For instance, a given sensor may be configured to detect such characteristics as movement, weight, physical contact, temperature, wind, noise, light, computer communications, wireless signals, humidity, the presence of radiation or specific chemical compounds, among several other examples. Sensors may generate numerical data describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110a-c, 115, etc.) may be provided to the neuromorphic computing system 105 to perform machine and deep learning on the information encapsulated in the data. Results produced by the neuromorphic computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a neuromorphic computing system 105, such as through the consumption of the results by one or more applications hosted by the user devices (e.g., 140, 145), presenting the results on a graphical user interface of the user device, among other examples.

In some instances, as implied by the example illustrated in FIG. 1, a neuromorphic computing system 105 may be provided as a service (e.g., over a network 130) to one or more other systems (e.g., 120, 140, 145). A neuromorphic computing system 105 may additionally utilize inputs generated by remote systems (e.g., an Internet of Things (IoT) network composed of multiple sensor devices (e.g., 110a-c). In other instances, the functionality of a neuromorphic computing system 105 may be integrated with any one of the other example systems (e.g., 110a-c, 115, 120, 130, 140, 145, etc.). For instance, a wearable device or IoT device (e.g., 110a-c) may be provided with neuromorphic computing resources to operate directly on inputs generated by a sensor of the device. As another example, an application or service may be provided (e.g., by application server system 120), which includes and makes use of neuromorphic computing resources, among a variety of other examples and use cases. Further, neuromorphic computing systems may utilized to support or implement products or services based on or utilizing artificial intelligence, including digital personal assistants, chat bots, video games, self-driving cars, robots, and other examples.

In general, "servers," "clients," "computing devices," "network elements," "hosts," "system-type system entities," "user devices," "sensor devices," and "systems" (e.g., 105, 110a-c, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Neuromorphic computing may involve the use of hardware-based systems (e.g., very-large-scale integration (VLSI) systems) containing electronic circuits or other logic to mimic neuro-biological architectures present in the nervous system to imbue computing systems with "intelligence". A desirable feature of neuromorphic computing is its ability to autonomously extract high dimensional spatiotemporal features from raw data streams that can reveal the underlying physics of the system being studied thus making them amenable for rapid recognition. Such features may be useful in big data and other large scale computing problems.

Traditional approaches to solving large scale computing problems have relied on experts to extract critical features from the data based on their domain knowledge. Until recently the common approach to address this sort of a problem has been to rely on expert features, these features were then fed to shallow machine learning classifiers such as boosted decision trees for classification. However, due to the high dimensional nature of the data and the absence of any complete analytical model for classification directly from theoretical principles, sometimes these expert designed features do not capture all of the available information. Moreover, in many cases, there is a lack of sufficient domain knowledge to even attempt such approaches. To address this issue, some solutions have deployed deep machine learning algorithms to directly classify from high dimensional data using low-level features to obviate the need for any domain knowledge. With availability of large amounts of training data as ground truth, as well as with the advent of large scale computing systems with extensive memory and compute power, these algorithms have become a valuable tool for classification and pattern recognition tasks for big data and large scale systems. Such "neurally-inspired" algorithms may be characterized by hierarchical and feedforward organization where the artificial neurons or processing units in lower levels of the hierarchy have small receptive fields that serve as input filters sensitive to low level features. The outputs of these filters may be then fed to the next level, pooling information across several previous level filters. This process is repeated until a classifier is trained to detect objects of interest in the final layer. The salient aspect of such algorithms is that neuronal activity at increasingly higher levels abstracts more general and complex features. The pooling operation is beneficial for extracting features that are often transformation invariant, thus forming a stable internal representation. Such solutions may be successfully applied to challenging problems in machine learning including object recognition and other examples.

While deep learning models (e.g., feed forward neural networks utilizing nonlinear activation functions) may bear resemblance in architecture to their biological counterparts, they have failed to explain recognition in general owing to its inability to generalize well to novel situations with limited training examples. There are many issues with current deep machine learning approaches. For instance, low-level processing determines high-level processing and thus information loss in lower stages is irretrievable. As another example, pooling operations result in seeing wholes at the expense of the parts, as is evident in target-distractor recognition tasks, where both target and distractor features at the lower level are pooled at the higher levels. Such models require millions of examples in order to learn to "average" out distractors, while extracting the most reliable target features. The resulting representation is brittle because the distractor set is virtually infinite, and thus even after a large number of training examples a new distractor can still cause false alarms. Additionally, all units and parameters at all levels of the network are engaged in representing any given input, and are adjusted together during learning.

In some implementations, an improved neuromorphic computing platform may be provided which adopts an architecture inspired by the brain that is both scalable, flexible, and energy efficient while also supporting multiple modes of learning on-chip. Furthermore, such neuromorphic computing hardware may be connected to, integrated with, or otherwise used together with general computing hardware (e.g., a CPU) to support a wide range of traditional workloads as well as non-traditional workloads such as dynamic pattern learning and adaptation, constraint satisfaction and sparse coding using a single compute platform. Such a solution may leverage understandings from biological neuroscience regarding the improvement of system level performance by leveraging various learning modes such as unsupervised, supervised and reinforcement using spike timing and asynchronous computation, among other example features and considerations.

Figure 2A:
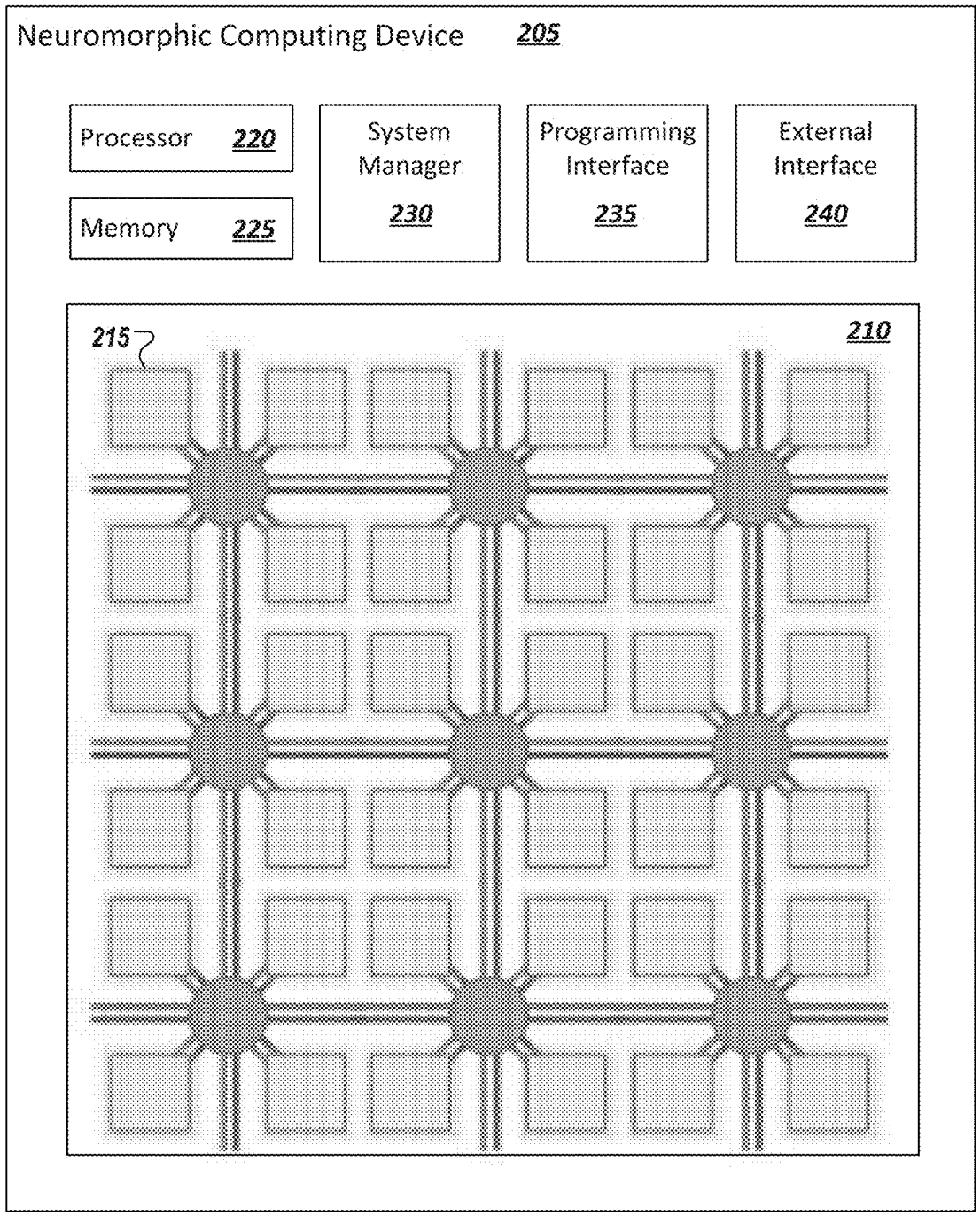
FIG. 2A illustrates a simplified block diagram of an example neuromorphic computing device utilizing a network of hardware-implemented neuromorphic cores.

In one implementation, a neuromorphic computing system is provided that adopts a multicore architecture where each core houses the computing elements including neurons, synapses with on-chip learning capability, and local memory to store synaptic weights and routing tables. FIG. 2A is a simplified block diagram 200 illustrating an example of at least a portion of such a neuromorphic computing device 205. As shown in this example, a device 205 may be provided with a network 210 of multiple neural network cores interconnected by an on-device network such that multiple different connections may be potentially defined between the cores. For instance, a network 210 of spiking neural network cores may be provided in the device 205 and may each communicate via short packetized spike messages sent from core to core over the network channels. Each core (e.g., 215) may possess processing and memory resources and logic to implement some number of primitive nonlinear temporal computing elements, such as multiple (e.g., 1000+) distinct artificial neurons (referred to herein as "neurons"). For instance, each core may be capable of concurrently implementing multiple neurons such that the collection of neuromorphic cores may implement many multiples of neurons using the device.

Continuing with the example of FIG. 2A, a neuromorphic computing device 205 may additionally include a processor 220 and system memory 225 to implement one or more components to manage and provide functionality of the device. For instance, a system manager 230 may be provided to manage global attributes and operations of the device (e.g., attributes affecting the network of cores 210, multiple cores in the network, interconnections of the device 205 with other devices, manage access to global system memory 225, among other potential examples). In one example, a system manager 230 may manage the definition and provisioning of a specific routing tables to the various routers in the network 210, orchestration of a network definition and attributes (e.g., weights, decay rates, etc.) to be applied in the network, core synchronization and time multiplexing management, routing of inputs to the appropriate cores, among other potential functions.

As another example, a neuromorphic computing device 205 may additionally include a programming interface 235 through which a user or system may specify a neural network definition to be applied (e.g., through a routing table and individual neuron properties) and implemented by the mesh 210 of neuromorphic cores. A software-based programming tool may be provided with or separate from the neuromorphic computing device 205 through which a user may provide a definition for a particular neural network to be implemented using the network 210 of neuromorphic cores. The programming interface 235 may take the input of the programmer to then generate corresponding routing tables (or other neuron and/or synapse definitions) and populate local memory of individual neuromorphic cores (e.g., 215) with the specified parameters to implement a corresponding, customized network of artificial neurons implemented by the neuromorphic cores.

In some cases, a neuromorphic computing device 205 may advantageously interface with and interoperate with other devices, including general purpose computing devices, to realize certain applications and use cases. Accordingly, external interface logic 240 may be provided in some cases to communicate (e.g., over one or more defined communication protocols) with one or more other devices. An external interface 240 may be utilized to accept input data from another device or external memory controller acting as the source of the input data. An external interface 240 may be additionally or alternatively utilized to allow results or output of computations of a neural network implemented using the neuromorphic computing device 205 to be provided to another device (e.g., another general purpose processor implementing a machine learning algorithm) to realize additional applications and enhancements, among other examples.

Figure 2B:
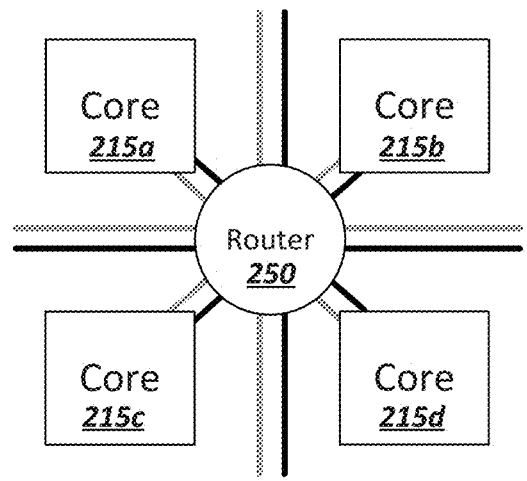
FIG. 2B illustrates a simplified block diagram illustrating a portion of a network of neuromorphic cores interconnected by one or more routers.

As shown in FIG. 2B, a block diagram 200b is shown illustrating a portion of a network fabric interconnecting multiple neuromorphic cores (e.g., 215a-d). For instance, a number of neuromorphic cores (e.g., 215a-d) may be provided in a mesh, with each core being interconnected by a network including a number of routers (e.g., 250). In one implementation, each neuromorphic core (e.g., 215a-d) may be connected to a single one of the routers (e.g., 250) and each of the routers may be connected to at least one other router (as shown at 210 in FIG. 2A). As an example, in one particular implementation, four neuromorphic cores (e.g., 215a-d) may be connected to a single router (e.g., 250) and each of the routers may be connected to two or more other routers to form a manycore mesh, allowing each of the neuromorphic cores to interconnect with each other neuromorphic core in the device. Moreover, as each neuromorphic core may be configured to implement multiple distinct neurons, the router network of the device may similarly enable connections, or artificial synapses (or, simply, "synapses"), to be defined between any two of the potentially many (e.g., 30,000+) neurons defined using the network of neuromorphic cores provided in a neuromorphic computing device.

Figure 2C:
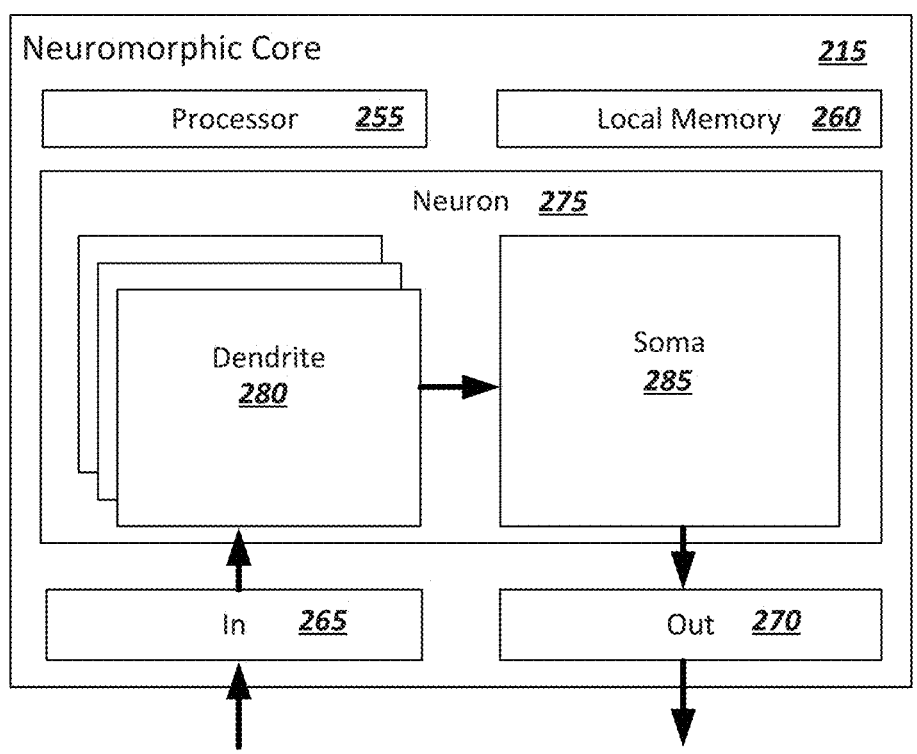
FIG. 2C illustrates a simplified block diagram of an example one of the number of neuromorphic cores implemented in an example neuromorphic computing device.

FIG. 2C shows a block diagram 200c illustrating internal components of one simplified example implementation of a neuromorphic core 215. In one example, a single neuromorphic core may implement some number of neurons (e.g. 1024) that share architectural resources of the neuromorphic core in a time-multiplexed manner. In one example, each neuromorphic core 215 may include a processor block 255 capable of performing arithmetic functions and routing in connection with the realization of a digitally implemented artificial neuron, such as explained herein. Each neuromorphic core 215 may additionally provide local memory in which a routing table may be stored and accessed for a neural network, accumulated potential of each soma of each neuron implemented using the core may be tracked, parameters of each neuron implemented by the core may be recorded, among other data and usage. Components, or architectural resources, of a neuromorphic core 215 may further include an input interface 265 to accept input spike messages generated by other neurons on other neuromorphic cores and an output interface 270 to send spike messages to other neuromorphic cores over the mesh network. In some instances, routing logic for the neuromorphic core 215 may be at least partially implemented using the output interface 270. Further, in some cases, a core (e.g., 215) may implement multiple neurons within an example SNN and some of these neurons may be interconnected. In such instances, spike messages sent between the neurons hosted on the particular core may forego communication over the routing fabric of the neuromorphic computing device and may instead by managed locally at the particular neuromorphic core.

Each neuromorphic core may additionally include logic to implement, for each neuron 275, an artificial dendrite 280 and an artificial soma 185 (referred to herein, simply, as "dendrite" and "soma" respectively). The dendrite 280 may be a hardware-implemented process that receives spikes from the network. The soma 285 may be a hardware-implemented process that receives each dendrite's accumulated neurotransmitter amounts for the current time and evolves each dendrite and soma's potential state to generate outgoing spike messages at the appropriate times. A dendrite 280 may be defined for each connection receiving inputs from another source (e.g., another neuron). In one implementation, the dendrite process 280 may receive and handle spike messages as they serially arrive in time-multiplexed fashion from the network. As spikes are received, the neuron's activation (tracked using the soma 285 (and local memory 260)) may increase. When the neuron's activation exceeds a threshold set for the neuron 275, the neuron may generate a spike message that is propagated to a fixed set of fanout neurons via the output interface 270. The network distributes the spike messages to all destination neurons, and in response to those neurons, in turn, update their activations in a transient, time-dependent manner, and so on, potentially causing the activation of some of these destination neurons to also surpass corresponding thresholds and trigger further spike messages, as in real biological neural networks.

As noted above, a neuromorphic computing device may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as shown in the example of FIGS. 2A-C may advantageously support any or all of these network models. As all cores of the device are connected, all neurons defined in the cores are therefore also fully connected through some number of router hops. The device may further include fully configurable routing tables to define a variety of different neural networks by allowing each core's neurons to distribute their spikes to any number of cores in the mesh to realize fully arbitrary connectivity graphs.

In an improved implementation of a system capable of supporting SNNs, such as illustrated in the example of FIGS. 2A-C, high speed and reliable circuits may be provided to implement SNNs to model the information processing algorithms as employed by the brain, but in a more programmable manner. For instance, while a biological brain can only implement a specific set of defined behaviors, as conditioned by years of development, a neuromorphic processor device may provide the capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of the neural circuits found in nature.

As an example, a neuromorphic processor may utilize time-multiplexed computation in both the spike communication network and the neuron machinery of the device to implement SNNs. Accordingly, the same physical circuitry of the processor device may be shared among many neurons to realize higher neuron density. With time multiplexing, the network can connect N cores with O(N) total wiring length, whereas discrete point-to-point wiring would scale as $O(N^2)$, realizing a significant reduction in wiring resources to accommodate planar and non-plastic VLSI wiring technologies, among other examples. In the neuromorphic cores, time multiplexing may be implemented through dense memory allocation, for instance, using Static Random Access Memory (SRAM), with shared buses, address decoding logic, and other multiplexed logic elements. State of each neuron may be stored in the processor's memory, with data describing each neuron state including state of each neuron's collective synapses, all currents and voltages over its membrane, among other example information (such as configuration and other information).

In one example implementation, a neuromorphic processor may adopt a "digital" implementation that diverts from other processors adopting more "analog" or "isomorphic" neuromorphic approaches. For instance, a digital implementation may implement the integration of synaptic current using digital adder circuits, as opposed to the analog isomorphic neuromorphic approaches that accumulate charge on capacitors in an electrically analogous manner to how neurons accumulate synaptic charge on their lipid membranes. The accumulated synaptic charge may be stored, for instance, for each neuron in local memory of the corresponding core. Further, at the architectural level of an example digital neuromorphic processor, reliable and deterministic operation may be realized by synchronizing time across the network of cores such that any two executions of the design, given the same initial conditions and configuration, will produce identical results. Asynchrony may be preserved at the circuit level to allow individual cores to operate as fast and freely as possible, while maintaining determinism at the system level. Accordingly, the notion of time as a temporal variable may be abstracted away in the neural computations, separating it from the "wall clock" time that the hardware utilized to perform the computation. Accordingly, in some implementation, a time synchronization mechanism may be provided that globally synchronizes the neuromorphic cores at discrete time intervals. The synchronization mechanism allows the system to complete a neural computation as fast as the circuitry allows, with a divergence between run time and the biological time that the neuromorphic system models.

In operation, the neuromorphic mesh device may begin in an idle state with all neuromorphic cores inactive. As each core asynchronously cycles through its neurons, it generates spike messages that the mesh interconnect routes to the appropriate destination cores containing all destination neurons. As the implementation of multiple neurons on a single neuromorphic core may be time-multiplexed, a time step may be defined in which all spikes involving the multiple neurons may be processed and considered using the shared resources of a corresponding core. As each core finishes servicing its neurons for a respective time step, the cores may, in some implementations, communicate (e.g., using a handshake) with neighboring cores using synchronization messages to flush the mesh of all spike messages in flight, allowing the cores to safely determine that all spikes have been serviced for the time step. At that point all cores may be considered synchronized, allowing them to advance their time step and return to the initial state and begin the next time step.

Given this context, and as introduced above, a device (e.g., 205) implementing a mesh 210 of interconnected neuromorphic cores may be provided, with the core implementing potentially multiple artificial neurons capable of being interconnected to implement an SNN. Each neuromorphic core (e.g., 215) may provide two loosely coupled asynchronous processes: an input dendrite process (e.g., 280) that receives spikes from the network and applies them to the appropriate destination dendrite compartments at the appropriate future times, and an output soma process (e.g., 285) that receives each dendrite compartment's accumulated neurotransmitter amounts for the current time and evolves each dendrite and soma's membrane potential state, generating outgoing spike messages at the appropriate times (e.g., when a threshold potential of the soma has been reached). Note that, from a biological perspective, the dendrite and soma names used here only approximate the role of these functions and should not be interpreted too literally.

Spike messages may identify a particular distribution set of dendrites within the core. Each element of the distribution set may represent a synapse of the modeled neuron, defined by a dendrite number, a connection strength (e.g., weight W), a delay offset D, and a synapse type, among potentially other attributes. In some instances, each weight $W_i$ may be added to the destination dendrite's total current u scheduled for servicing at time step $T+D_i$ in the future. While not handling input spikes, the dendrite process may serially service all dendrites sequentially, passing the total current u for time T to the soma stage. The soma process, at each time step, receives an accumulation of the total current u received via synapses mapped to specific dendritic compartments of the soma. In the simplest case, each dendritic compartment maps to a single neuron soma. In other instances, a neuromorphic core mesh architecture may additionally support multi-compartment neuron models. Core memory may store the configured attributes of the soma and the state of the soma, the total accumulated potential at the soma, etc. In some instances, synaptic input responses may be modeled in the core with single-time-step current impulses, low state variable resolution with linear decay, and zero-time axon delays, among other example features. In some instances, neuron models of the core may be more complex and implement higher resolution state variables with exponential decay, multiple resting potentials per ion channel type, additional neuron state variables for richer spiking dynamics, dynamic thresholds implementing homeostasis effects, and multiple output spike timer state for accurate burst modeling and large axonal delays, among other example features. In one example, the soma process implemented by each of the neuromorphic cores may implement a simple current-based Leaky Integrate-and-Fire (LIF) neuron model.

Figure 3A:
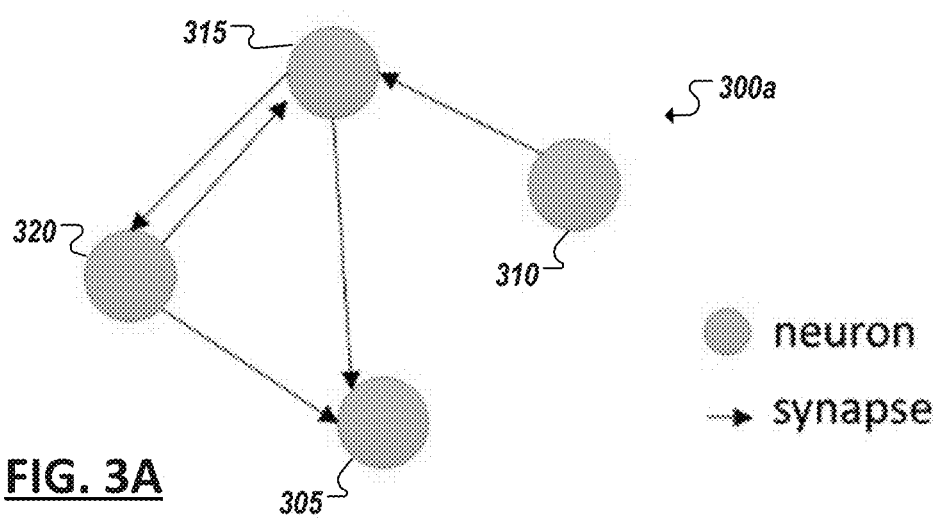
FIGS. 3A-3B are simplified block diagrams of portions of example neural networks capable of being implemented using an example neuromorphic computing device.

As noted above, the basic computation units in an example neuromorphic computing architecture may be neurons and the neurons may be connected by synapses, which define the topology of the neural network. Synapses are directional, and neurons are able to communicate to each other if a synapse exists. FIG. 3A is a simplified block diagram 300a illustrating a simple example neural network, including neurons 305, 310, 315, 320 connected by synapses. The synapses allow spike messages to be transmitted between the neurons. For instance, neuron 305 may receive spike messages generated by neurons 315, 320. As neuron 305 receives spike messages from the other neurons it is connected to, the potential of the neuron 305 may exceed a threshold defined for the neuron 305 (e.g., defined in its soma process) to cause the neuron 305 itself to generate and transmit a spike message. As noted, synapses may be directional. In some cases, a network and corresponding synapses may be defined such that a neuron (e.g., 315) only receives or transmits to some of the other neuron (e.g., 305), while in synapses may be defined which connect the neuron bi-directionally with other neurons (e.g., between neurons 315, 320) to create a feedback loop, among other examples.

An example neuromorphic computing device may adopt leaky integrate-and-fire neurons and current-based synapses. Accordingly, the dynamics of the network may be driven by the evolution of the state variables in each neuron. In one example, each neuron has two types of state variables: one membrane potential v(t), and one or more dendritic current(s) $u^1(t), \ldots$ to $u^s(t)$. An individual neuron's dynamics may be defined by the following continuous-time differential equations (1)-(3).

$$\frac{du^k(t)}{dt} = \frac{-1}{\tau_s^k} u^k(t), k = 1, 2, \ldots, s \qquad (1)$$

$$\frac{dv(t)}{dt} = \frac{-1}{\tau_m} v(t) + \sum_{k=1}^{s} u^k(t) + I^{bias} \qquad (2)$$

if $v(t^-) \geq \theta$, Spike, and $v(t^+) = 0$ \qquad (3)

Equation (1) depicts the dynamics of dendritic current. Each dendritic current variable may be defined to decay exponentially over time, according to its respective decay time constant $\tau_s^k$. The dendritic current may be linearly summed to control the integration of the membrane potential (as shown in Equation (2)). Similar to dendritic current, the membrane potential may also be subject to exponential decay with a separate membrane potential time constant $\tau_m$. Equation (3) may define the spiking event of a neuron. When a neuron's membrane potential reaches a particular threshold voltage $\theta$ defined for the neuron, the neuron (e.g., through its soma process) resets the membrane potential to zero (or to a pre-determined value), and sends out a spike to neighboring neurons connected by corresponding synapses. The dendrite process of each neuron can be defined such that a spike arrival causes a change in the dendritic current. Such interactions between neurons lead to the complex dynamics of the network. Spikes are transmitted along synapses and the incoming synapse may be defined to be associated with one dendritic current variable, e.g., using the dendritic compartment. In such implementations, each spike arrival changes only one dendritic current $u^k(t)$. The change may be defined to manifest as an instantaneous jump in $u^k(t)$, such as defined in Equation (4), based on the magnitude of the synaptic weight $w_{ij}$.

$$u^k(t^+) = u^k(t^-) + w_{ij} \qquad (4)$$

Accordingly, in some implementations, in addition to the state variables of a neuron, there are several other configurable parameters, including the time constant of individual dendritic compartment $\tau_s^1, \ldots, \tau_s^s$, a single $\tau_m$, $\theta$, $I^{bias}$ for each neuron, and a configurable weight value $w_{ij}$ for each synapse from neuron j to i, which may be defined and configured to model particular networks.

Figure 3B:
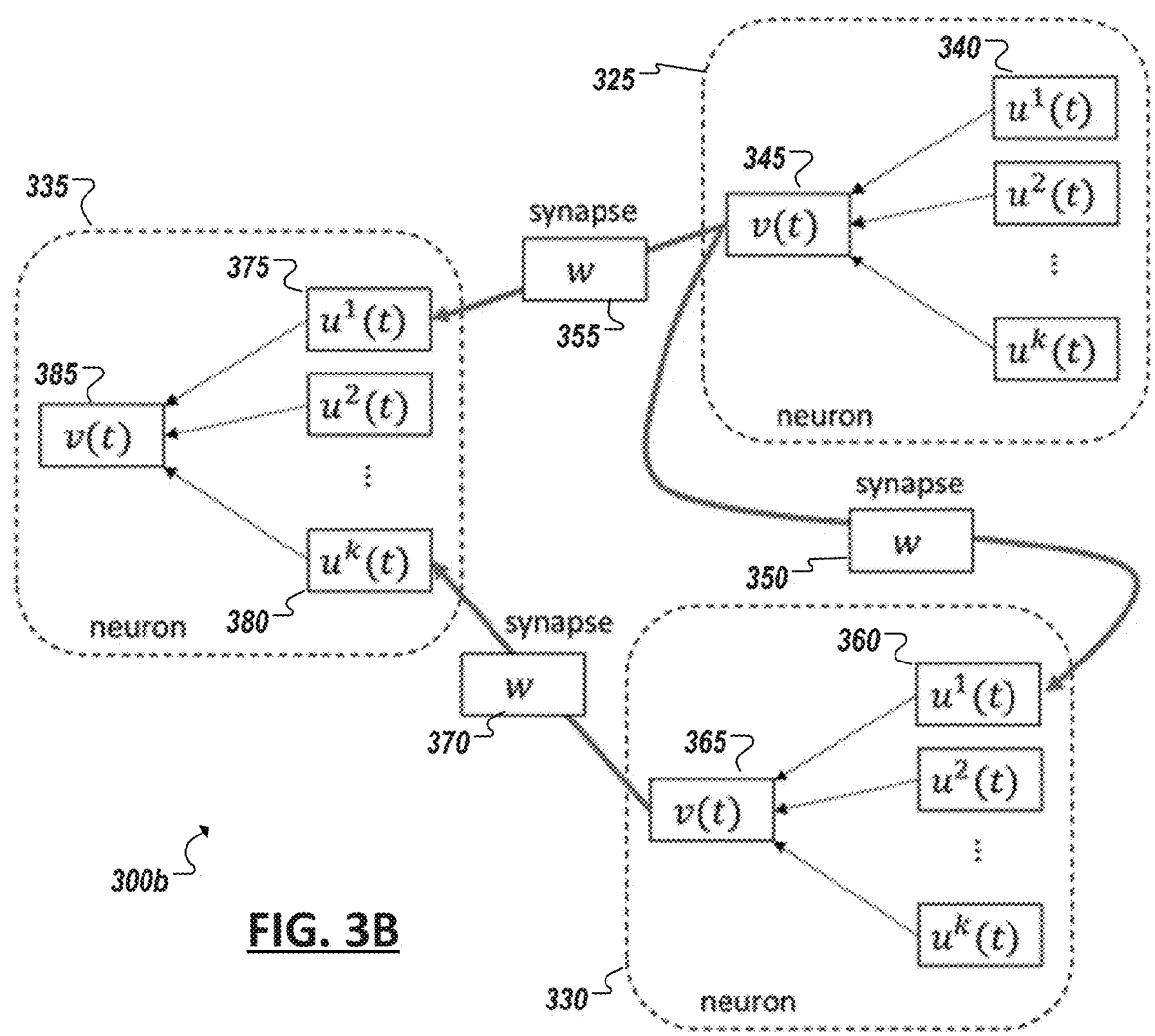

For instance, FIG. 3B shows an example illustrating synaptic connections between individual dendrites of neurons in a network, and the parameters that may be defined for these neurons and synapses. As an example, in FIG. 3B, neurons 325, 330, 335 implemented by cores of an example neuromorphic computing device are shown, together with synapses defined (e.g., using a routing table) for interconnections within a neural network implemented using the neurons 325, 330, 335. Each neuron may include one or more dendrite (processes) (e.g., 340, 360, 375, 380) and a respective soma (process) (e.g., 345, 365, 385). Spike messages received at each of the dendrites of a respective neuron may contribute to the activation potential of the soma, with the soma firing a spike message when the soma-specific potential threshold is reached. A synapse connects two neurons. The synapse may effectively connect the soma of a sending neuron to one of the dendrites of the receiving neuron. Further, each synapse may be assigned a respective weight (e.g., 350, 355, 370). In the example of FIG. 3B, a synapse with a first weight 350 may connect soma 345 of neuron 325 with dendrite 360 of neuron 330. Soma 345 of neuron 325 may additionally connect to neuron 380 via another synapse (with potentially a different weight 355). Soma 365 of neuron 330 may also connect to neuron 380 via a respective synapse 370. In some cases, multiple neurons may connect to a particular neuron at the same dendrite of the particular neuron. In such instances, the parameters defined for this one dendrite will govern the effect of the incoming spike messages from each of the connected neurons. In other cases, such as shown in FIG. 3B, different neurons (e.g., 325, 330) may connect to the same neuron (e.g., 335) but at different dendrites (e.g., 375 and 380 respectively), allowing different parameters (defined for each of these dendrites (e.g., 375, 380)) to affect the respective spikes arriving from each of these different neurons (e.g., 325, 330). Likewise, parameters may be defined for each of the somas (e.g., 345, 365, 385) of each of the various neurons (e.g., 325, 330, 335) defined in the network, allowing these parameters to likewise contribute to the overall configurability of the neural network implemented using the neuromorphic computing device, among other examples.

As a summary, neuron parameters may include such examples as a synaptic decay time constant $\tau_s$, bias current $I_b$, firing membrane potential threshold $\theta$, and synaptic weight $w_{ij}$ from neuron to neuron (i.e., from neuron j to neuron i). These parameters may be set by a programmer of the neural network, for instance, to configure the network to model a real network, matrix, or other entity. Further, neuron state variables may be defined to include time-varying current u(t) and voltage v(t) and represented by corresponding ordinary differential equations.

As noted above, Equations (1-(4) defines spiking neural network dynamics in continuous time. In a digital neuromorphic computing device, a network of neuromorphic cores is provided (such as shown and discussed in connection with FIGS. 2A-2C), with each of the neuromorphic cores possessing processor resources and logic executable to solve the continuous network dynamics using first-order techniques, such as by approximating SNN dynamics using discrete time steps. In one example, a virtual global clock is provided in the neuromorphic computing device to coordinate the time-stepped updates of individual neurons at each core. Within a time step, every neuron implemented by the network of cores can adjust (e.g., in a time-multiplexed manner) its respective state variables, and will do so no more than once per time step. Further, each spike message generated by a neuron in the SNN may be guaranteed to be delivered within a corresponding time step. Such a digital approximation may be realized as follows. Given the values of state variables at time $t_1$, the state variable values at $t_2$ after a fixed time interval $\Delta t$, $t_2 = t_1 + \Delta t$, can be obtained using Equations (5)-(8):

$$u^k(t_2^-) = u^k(t_1)e^{\frac{-\Delta t}{\tau_s^k}}, k = 1, 2, \ldots, s \quad (5)$$

$$v(t_2^-) = v(t_1)e^{\frac{-\Delta t}{\tau_m}} + \sum_{k=1}^{s} \tau_s^k [u^k(t_1) - u^k(t_2^-)] + I^{bias}\Delta t \quad (6)$$

$$\begin{cases} \text{if } v(t_2^-) \geq \theta, \text{ Spike, and } v(t_2) = 0 \\ \text{otherwise, } v(t_2) = v(t_2^-) \end{cases} \quad (7)$$

$$u^k(t_2) = u^k(t_2^-) + \sum_j w_{ij}, \text{ for all spike arrivals to neuron } i \quad (8)$$

Learning within an SNN may be based on learning rules targeting the modeling of synaptic weight changes of artificial synapses defined with in the SNN. While traditional learning has utilized spike-timing dependent plasticity (STDP) learning rules, an improved system may alternatively or additionally provide learning rule that represents an optimization of digital implementation of a post-synaptic-potential-dependent (Vm) learning rule that can provide learning results comparable to traditional STDP learning rules in an SNN. For instance, a unidirectional potential ($V_m$) learning rule may be defined and implemented in the digital system that is triggered by only pre-synaptic spikes and post synaptic potential. This may enable, among other example features and benefits, index based memory compression and uni-directional memory access. Using such a Vm-based learning paradigm, spatio-temporal spike patterns can be classified, as through STDP learning rules. The Vm-based learning rule may yield results comparable to STDP, but may be advantageously implemented in a neuromorphic computing system, as traditional STDP-based learning approaches use significant memory hardware overhead, among other example issues.

Modern neuromorphic devices and systems may aim to capitalize on event based temporal processing and unsupervised learning features of brain inspired spiking neural networks, for efficient, low-power and robust computation. As alluded to above, however, one of the primary factors that discourages implementation of plasticity on neuromorphic devices is the added complexity in the type of memory required to implement traditional spike-based learning rules (e.g., pairwise STDP). In such cases, event driven implementation of this learning rule triggers an update in the synaptic weight both at the arrival of a presynaptic spike and generation of a postsynaptic weight. This may necessitate accesses to memory associated with the corresponding synaptic weight location in a bidirectional manner (i.e., both based on the identity both pre-synaptic and postsynaptic neurons, placing difficult demands on the memory performance of the neuromorphic computing device. Such factors hold true also for triplet-based STDP rules.

Improved systems may be provided that address at least some of the example issues above. For instance, a neuromorphic computing device may be provided to support a post-synaptic membrane potential dependent event-driven learning rule that statistically emulates pairwise STDP-like behavior for excitatory synapses. Such Vm-based learning rules may be extremely hardware efficient due to dependence only on the presynaptic spike timing and not on the postsynaptic spike timing. In addition, an example Vm-based learning rule may additionally enable a neuron to learn and identify complex temporal spike patterns embedded in a stream of spikes in an unsupervised manner. Using such Vm-based learning rule may enable efficient learning with much lower area, memory and power consumption, among other example benefits.

Figure 4:
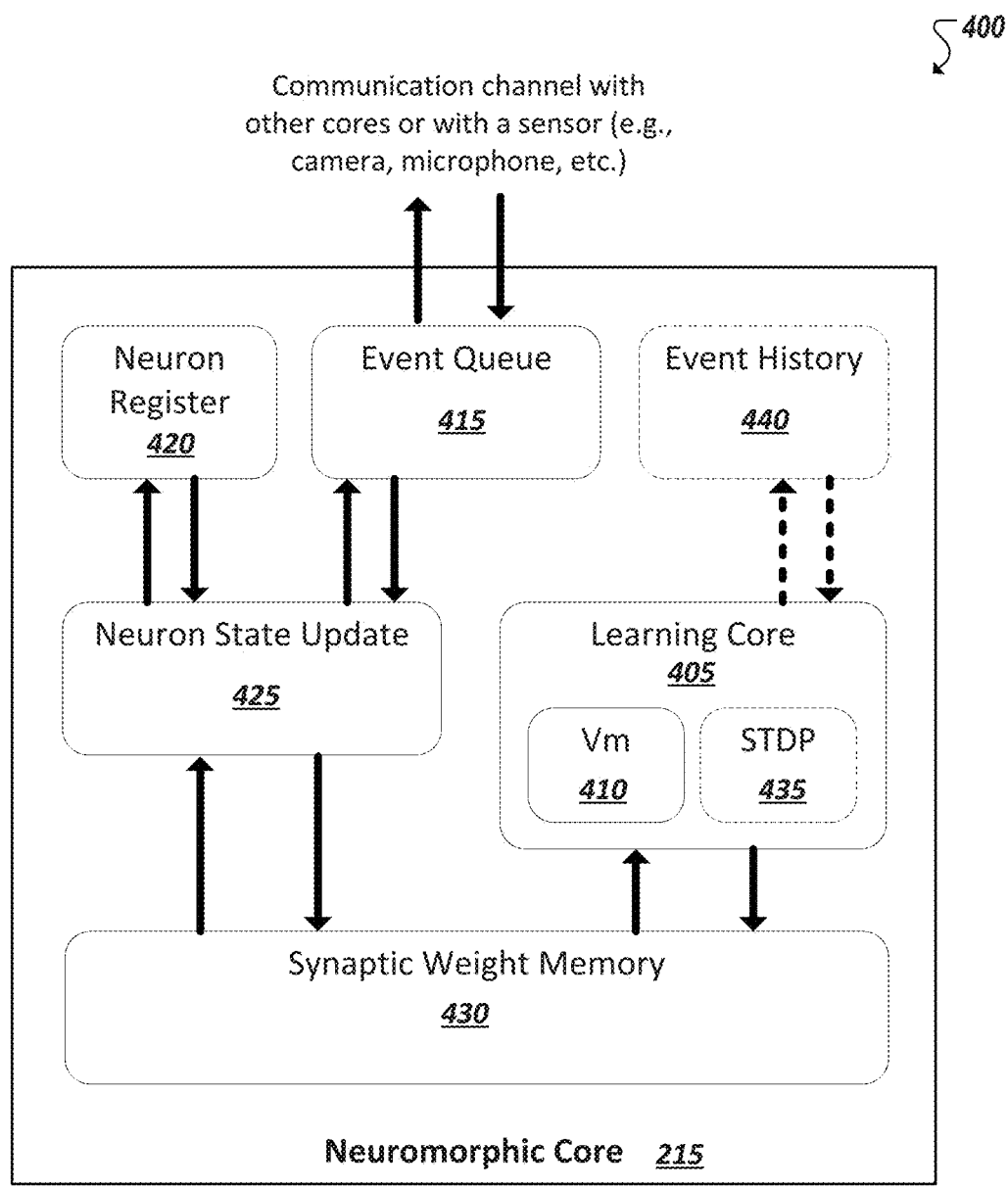
FIG. 4 is a simplified block diagram illustrating a portion of an example spiking neural network (SNN).

Turning to FIG. 4, a simplified block diagram 400 is provided illustrating an example implementation of an improved neuromorphic core 215 (which may be duplicated in a network or mesh of neuromorphic cores on a particular neuromorphic computing device, such as introduced and discussed in connection with FIGS. 2A-2B). The neuromorphic core 215 may include a learning core 405, which include machine executable logic (implemented in hardware and/or software) to implement plasticity within the SNN and support learning rules to drive adaptive changes to the synaptic weights defined within the SNN. In one example, the learning core 405 may include logic 410 to implement a Vm-based learning rule, such as described herein. In some implementations, the learning core 405 may additionally provide STDP-based learning rule logic 435 to allow either the Vm-based learning rule or traditional STDP-based learning rules to be selectively employed within SNNs implemented using the neuromorphic core 215.

Continuing with the example of FIG. 4, an example neuromorphic core 215 may include additional components such as an event queue to interface with one or more communication channels (e.g., facilitated by a routing fabric of the neuromorphic computing device) to receive inputs (e.g., spikes) from input sources (e.g., sensors, data sources, software programs, etc.) or other neuromorphic cores (e.g., implementing pre-synaptic neurons connected to neurons implanted using the neuromorphic core 215). The event queue 415 may additionally handle the sending of output spikes generated by artificial neurons implemented on the neuromorphic core 215 and allow these output spikes to be transmitted to other neuromorphic cores on the device (hosting certain post-synaptic neurons) or as output spike, which may be fed to actuators, software services, databases, or other system adapted to receive and utilize outputs generated by SNNs implemented using the neuromorphic core 215.

A neuron state update module 425 may be provided on each instance of an example neuromorphic core 215 and include logic and manage memory used to track the state of each neuron implemented using the neuromorphic core 215. In particular, the neuron state update module 425 may, among other state variables, track the current membrane potential of each neuron and may determine when the membrane firing threshold has been met to trigger a spike by the neuron and the membrane potential of the neuron after firing. The model used by the neuron state update module 425 to determine the effect of incoming spikes, potential decay, post-firing potential, etc. of any one of the neurons implemented on the neuromorphic core 215 may be based on the specific parameters defined for each of these neurons. Such parameters, such as the decay rate, firing threshold, etc. may be defined and maintained in neuron register 420. Should a programmer decide to make adjustments to an SNN implemented on the neuromorphic computing device, changes made to individual neurons within the SNN may be reflected through updates to the corresponding neurons' parameters made at the neuron register 420.

Interconnections between neurons implemented on the neuromorphic core 215 and other neurons implemented on the same or other cores of the neuromorphic computing device may be defined using an example synaptic weight memory module 430. Initial synaptic weights may be defined, in some cases, in connection with the initial definition of an SNN implemented on an example neuromorphic computing device. The synaptic weight memory module 430 may additional include logic to model the various synapses connecting the neurons, including the current synaptic weight to be applied to each synapse. The individual weights may be updated based on the weight update operations performed using the learning core 405. For instance, as spike traverse the SNN, depending on the learning rule applied by the learning core, weights of individual artificial synapses defined within the SNN may be updated based on the learning rule applied by the learning core 405. The synaptic weight memory module 430 may track the current weight of each synapse, at each time step, and the training of the SNN may be based on the trends and convergence of synaptic weight values for synapses within the SNN.

As noted above, a learning core 405 may support multiple different learning rules, which may be selectively applied within a given SNN. In cases of an STDP-based rule (implemented using block 435), the neuromorphic core 215 may additionally be provided with an event history tracker 440 to track the receipt of all pre-synaptic spikes of each neuron implemented using the neuromorphic core 215 and all post-synaptic spikes of these same neurons, along with timing information of the same. From this history information, STDP-based synaptic weight changes may be computed according to the STDP learning rule, given STDP's reliance on spike timing. It should be appreciated that a Vm-based learning rule (e.g., implemented using logic 410) may omit the use of the event history module 440 and the memory required to perform such spike tracking at both the pre- and post-synaptic level.

As noted above, in some neuromorphic core design, synaptic memory constitutes a large fraction of neuromorphic device area. By optimizing the memory area, the overall density may be improved, allowing the neuromorphic device to be incorporated in increasingly more applications. However, in order to implement traditional STDP learning rules, a memory with bi-directional memory access is typically required. However, SRAM memories are not natively designed for such access in an efficient manner, especially for sparsely connected networks. As a result, traditional solutions rely on design of custom memory architecture such as the bidirectional crossbar memory architecture, among other examples. While such may be a viable solution for the implementation of STDP based learning rules, it is very expensive in terms of total memory and hence total chip area. Moreover, techniques such as memory compression using index based/linked list exist to assist in saving chip area, such techniques are generally not applicable in bi-directional memories (e.g., given that only the destinations from a given source may be determined, but not all sources given destination.

Figure 5:
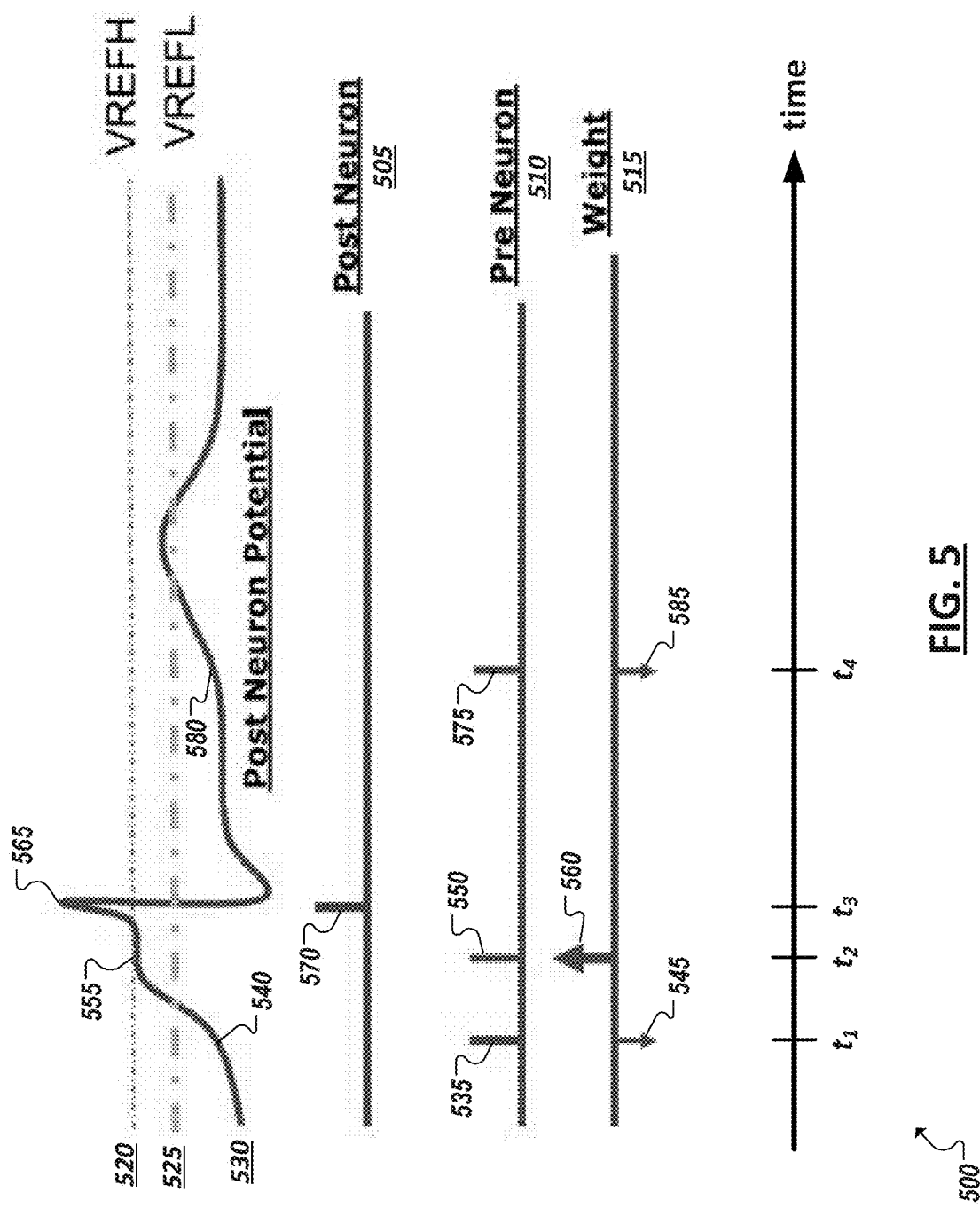
FIG. 5 is a diagram illustrating application of an example post-neuron-potential-based learning rule.

FIG. 5 is a simplified block diagram illustrates an example of an improved Vm-based learning rule. Such a Vm-based rule can take advantage of compressed memory schemes (such as described above) and still perform synaptic plasticity. For instance, in the example Vm-based learning rule illustrated in FIG. 5, synaptic weights are to be updated only when a pre-neuron (of the synapse connecting the pre-neuron to a corresponding post-neuron) is fired, but based on post-neuron potential at the time of firing.

In this example, a membrane threshold voltage (VREFL (or "$V_{ith}$")) 525 is defined for each neuron. From the perspective of the synapse, for whose weight the rule is to update, the membrane threshold voltage VREFL corresponds to the post-neuron 505. The pre-neuron 510 is connected to the post-neuron by the synapse and may be one of many pre-neurons connected (by respective artificial synapses) to the same post-neuron 505. Further, a given pre-neuron (e.g., 510) may also be connected to and send output spikes (fan-out) to multiple different post-neurons (using other synapses).

In the example of FIG. 5, events over a series of times steps are represented involving two artificial neurons (a pre- and post-neuron) connected by a particular artificial synapse. Changes to the synaptic weight 515 of the particular synapse are presented over time, with weight updates (e.g.,

545, 560, 580) causing the synaptic weight 515 to be adjusted upward or downward based on the events and a Vm-based learning rule. The membrane potential 530 of the post-neuron 505 over time is similarly represented. In this example, a high voltage reference threshold (VREFH) 520 corresponding to the firing membrane potential defined for the post-neuron 505. In other words, when the membrane potential 530 meets or exceeds the firing potential VREFH 520 (such as at point 565), the post-neuron is to emit a spike (e.g., 570), draining the membrane potential of the post-neuron. Membrane potential 530 of the post-neuron is to increase in accordance with pre-synaptic spikes (e.g., 535, 550, 575) received from pre-neurons including pre-neuron 510. Further, for purposes of the Vm-based learning rule illustrated in this example, a low voltage reference threshold (VREFL) is defined and shown in the diagram 500.

In one example, a Vm-based learning rule may be defined according to the assumption that pre-synaptic spikes that arrive when the post-neuron membrane potential 530 is already relatively close to the post-neurons firing potential 520 are substantially more likely to have a causal relationship to the next post-synaptic spike emitted by the post-neuron than pre-synaptic spikes received when the present post-neuron membrane potential 530 is lower and further removed from the post-neuron's firing threshold 520. This observation can serve as the basis of the Vm-based learning rule, which may serve as a substitute for more resource-intensive STDP learning rules designed to mimic STDP in biological neural networks. Specifically, a threshold voltage (e.g., VREFL 525) may be defined, which is less than but near the value of the firing threshold 520. In some instances, VREFL may be defined according to a standard (e.g., a set value, within a statistical deviation from VREFH, a fixed percentage of VREFH, etc.). In other examples, an optimized, custom, or application-specific VREFL value may be determined on a per-SNN or per-neutron basis, among other examples.

In one implementations, when a pre-synaptic spike (e.g., 535, 550, 575) is sent on the synapse by the pre-neuron, the current post-neuron membrane potential 530 at the time of the pre-synaptic spike may be identified and compared against the threshold voltage 525 to determine whether the current post-neuron membrane potential 530 is greater than (or, in some cases, equal to) the threshold potential value 525. In some implementations, a hardware or software-based comparator may be utilized to perform the comparison when a pre-synaptic spike is detected. According to the Vm-based learning rule, if the current post-neuron membrane potential 530 at the time of a given pre-synaptic spike is higher than the threshold voltage 525, the weight 515 of the synapses can be increased by a value. However, if the current post-neuron membrane potential 530 at the time of a given pre-synaptic spike is lower than the threshold voltage 525, the weight 515 of the synapses can be decreased by a respective value. In some cases, the Vm learning rule may further specify that the current post-neuron membrane potential 530 be both higher than (or higher than or equal to) the threshold potential 525 and lower than (or lower than or equal to) the firing threshold 520 of the post-neuron in order for a weight increase (e.g., 560) to be triggered for the synapse. Accordingly, a second comparator or other logic may also be provided (based on VREFH) in accordance with the Vm rule logic to confirm that the current post-neuron potential is both higher than the threshold value 525 and lower than the firing threshold 520 in order to trigger an increase in the synaptic weight corresponding to the pre-synaptic spike. In other implementations, VREFH and VREFL may be considered independent, with the first comparator utilized to detect whether the membrane potential exceeds the threshold potential value 525 and the second comparator provided to detect when the post-neuron is to fire (based on the firing threshold 520 being met or exceeded), among other examples.

Against this backdrop, in the particular example of FIG. 5, a particular post-neuron 505 may be connected to multiple pre-synaptic neurons via multiple respective artificial synapses. Accordingly, post-neuron 505 may be receiving pre-synaptic spikes from multiple artificial neurons, each contributing increases (and even, in some cases, decreases) in the current post-neuron potential state 530 of the post-neuron 505. Further, additional parameters of the post-neuron model implemented in a neuromorphic core may dictate rates of decay, leakage, and other parameters, which may further affect increases and decreases in the post-neuron potential 530. In the example of FIG. 5, pre-neuron 510 represents a particular one of these pre-synaptic neurons and the weight 515 of the synapse connecting pre-neuron 510 to post-neuron 505 is presented in this example.

In this example, pre-neuron 510 may send a particular spike 535 at time step $t_i$. The post neuron potential 530 corresponding to spike 535 may be identified to determine whether it is greater than or less than the Vm rule potential threshold 525. In some implementations, the "current" post-neuron potential corresponding to the spike may actually be the potential at the timestep after the timestep in which the spike 535 was sent (e.g., in order to protect against corner cases in which the spike 535 is sent in the same timestep as a post-synaptic spike, but still credited as being causal of the post-synaptic spike per the Vm learning rule). In the present example, it is determined that the current post-neuron potential (e.g., 540) corresponding to the spike 535 is less than the threshold potential 525. Accordingly, the Vm learning rule logic assumes an acausal relationship between the pre-synaptic spike 535 and the next post-synaptic spike (e.g., 570) causing the synaptic weight of the synapse to be decreased 545 in response to the pre-synaptic spike 535. However, unlike traditional STDP, this weight update can be determined and applied immediately following the pre-synaptic spike 535 (i.e., in real time) and before the next post-synaptic spike (e.g., 570).

Continuing with the example of FIG. 5, a next spike 550 sent by the pre-neuron 510 to post-neuron 550 (at timestep $t_2$) may result in a subsequent comparison of the post-neuron potential 530 corresponding to the sending of pre-neuron 510 to this time determine that the current post-neuron potential 555 exceeds the potential threshold 525. As a result, Vm learning rule logic can cause the synaptic weight 525 to increase 550 in response to the sending of spike 550 (e.g., based on an assumption that the spike 550 will cause the post-neuron potential to increase and exceed the post-neuron's firing potential 520). Indeed, as shown in this example, the receipt of spike 550 does increase the post-neuron potential beyond the firing threshold (e.g., at 565) causing post-neuron to emit a post-synaptic spike 570. This causes the post-neuron potential to fall well below the threshold potential 525 and firing potential 520 as a result of the post-synaptic spike 570. Consequently, in this example, the next pre-synaptic spike 575 by the pre-neuron 510 (at timestep $t_3$) fires while the post-neuron potential 530 is still below (at 580) the threshold potential 525, resulting in the synaptic weight again decreasing (at 585) in accordance with the Vm learning rule in response to spike 575. Similar synaptic weight adjustments may be made for other synapses to which the Vm learning rule has been programmed to apply. For instance, similar comparisons to a threshold voltage can be made for pre-synaptic spikes sent on other synapses by the other pre-neurons connected to post-neuron 505. Further, it should be appreciated that pre-neuron 510 may be a post-neuron on another synapse implemented in an example SNN (and post neuron may be a pre-neuron on still another synapse), with a firing threshold and Vm threshold potential defined for the Vm learning rule when applied to neuron 510. Indeed, different firing thresholds and corresponding Vm threshold potential values may be defined for different artificial neurons within the SNN. In still other examples, a Vm-based learning rule (such as discussed above) may only be applied in a subset of the synapses defined in an SNN, with other learning rules (e.g., STFP) being applied to other synapses in the same SNN, among other example variants.

In some implementations, an example Vm learning rule, such as represented in the example of FIG. 5, may be tunable (e.g., during programming of the SNN implemented on a neuromorphic computing device). For instance, a programmer can define the degree to which the synaptic weight is changed in response to a pre-synaptic spike based on the Vm learning rule. For instance, in some implementations, the degree to which a synaptic weight is increased or decreased in response to a given pre-synaptic spike may correlate or be proportional to the degree which the current post-neuron potential corresponding to the spike is above or below the Vm threshold potential 525. For instance, if a spike (e.g., 545) is sent when the post-neuron potential is substantially lower than the threshold potential 525, the resulting weight decrease (e.g., 545) may be more extreme than if the current post-neuron potential (e.g., 540) were just below the threshold potential 525. Similarly, if the current post-neuron potential corresponding to a spike is just above (or at) the threshold potential 525, only a modest weight increase may be defined to be applied based on the Vm learning rule, while other spikes received when the current post-neuron potential (e.g., 555) is higher than the threshold potential 525 and relatively close to the firing threshold (as in spike 550) may result in a larger weight update (e.g., 560). In other cases, a fixed weight increase and decrease (e.g., potentially the same or different values for increases and decreases respectively) may be defined to be applied that ignore the relative distance of the current post-neuron potential above or below the Vm threshold potential for any given pre-synaptic spike. In still other examples, parameters of the Vm learning rule may be tuned such that at least some of the weight changes are inversely correlated to whether the current post-neuron potential for a spike is above the threshold voltage 525 or not (e.g., with the synaptic weight being reduced in response to a spike occurring when the current post-neuron potential is higher than the Vm threshold potential 525), among other example variants. In this manner, a wide variety of different SNNs may be programmed and implemented on a neuromorphic computing device to model a variety of different networks and other subjects.

The example Vm-based learning rule discussed above may be mathematically represented in equations such as the following:

$$\Delta W = \Delta W_v \Delta W_h$$

$$\Delta W_v = \delta(V_m(t+1) > V_{ith})\eta_+ - \delta(V_m(t+1) < V_{ith})\eta_-$$

$$\Delta W_h = \eta_h(Ca_t - Ca)S(t - t_{pre})$$

where the weight update rule consists of two components $\Delta W_v$ and $\Delta W_h$ and where ($\delta$ True)=1 and ($\delta$ False)=0. In this example, $\eta_+$ and $\eta_-$ are dictate the magnitude of positive and negative weight updates (e.g., which may be tuned as parameters for each synapse). $V_{ith}$ (or VREFL) is the membrane threshold voltage that determines whether the weight should be potentiated (LTP) or depressed (LTD). $Ca_t$ is the target calcium concentration and Ca is the current calcium concentration, where $\eta_h$ is the magnitude of rate of homeostasis and S is a pre-synaptic spike train.

Figure 6:
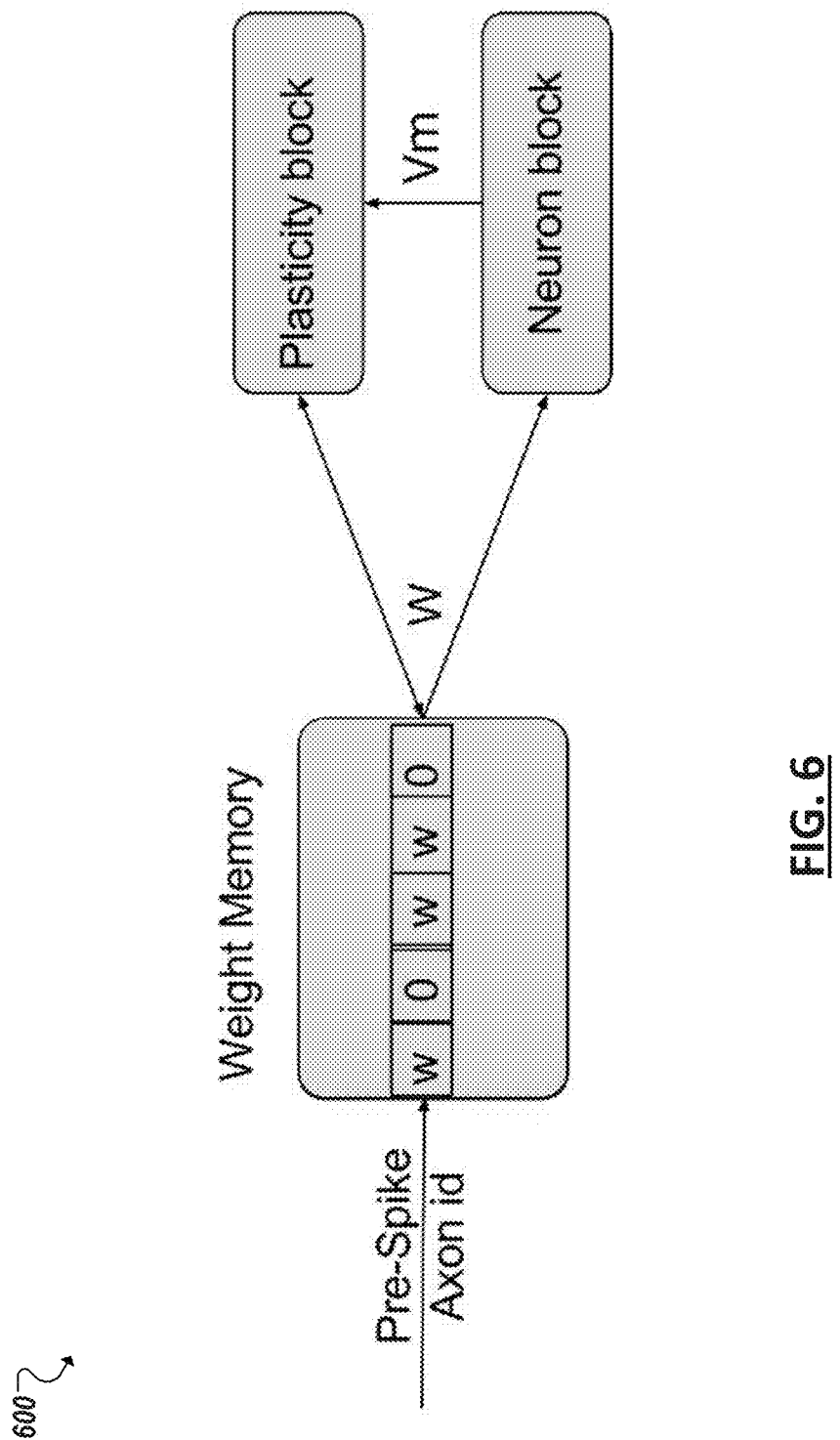
FIGS. 6-11 are plots illustrating performance of an example SNN applying an example post-neuron-membrane-potential-based learning rule.

Neuromorphic devices generally aim to capitalize on event based temporal processing and unsupervised learning features of brain inspired spiking neural networks, for efficient, low-power and robust computation. Learning capability in neuromorphic devices is obtained through the use of plastic synapses. As noted above, learning rules based on STDP or other models of synapse plasticity may be difficult to implement in hardware. Indeed, due to such design complications, traditional learning rules are typically not implemented on neuromorphic devices leaving the devices to implement synapse plasticity by inference. As discussed above, an improved, Vm-based learning rule may resolve these deficiencies and lend itself well to implementation in hardware of an example neuromorphic computing device. FIG. 6, for instance, shows a block diagram 600 of the use of a unidirectional pointer-based table for use in implementing the example Vm-based learning rule in hardware (e.g., through unidirectional memory access).

In addition to facilitating an efficient and practical hardware implementation, the Vm-based learning model may yield results comparable to STDP learning rules in achieving learning features of an SNN. For instance, the Vm-based learning rules may be used to learn and classify complex spatio-temporal spike patterns in an unsupervised manner using individual neurons. For instance, one computational capability of STDP empowered neurons is the ability to learn correlated activity in a form of Hebbian learning. For instance, turning to FIG. 7, a raster plot 700 of spikes within an example SNN implemented on a neuromorphic computing device is illustrated. In this example, 225 inputs are provided to 40 artificial neurons. In this example, the first 20 of the inputs are synchronous. The synaptic learning rule drives the weights of synchronously firing inputs to potentiate and other synaptic weights are depressed as can be seen in the grey scale image 705 of the right sub-plot. As a result the post synaptic neurons only fire (e.g., at 710, 715, 720, 725) when there is coincidence of spikes. An example membrane potential of one of the 40 neurons is shown in the lower sub plot 730. In this example, the weights of all 225 synapses are initialized randomly from a uniform distribution. Over time the weight of synapses with synchronous inputs, or coincident spiking activity, drift to high weights. The input weights of synapses that lack synchrony are driven to low weights. As a result, the post synaptic neurons learn to fire only when there is coincident spiking activity from the first 20 inputs, to train the SNN.

Figure 7:
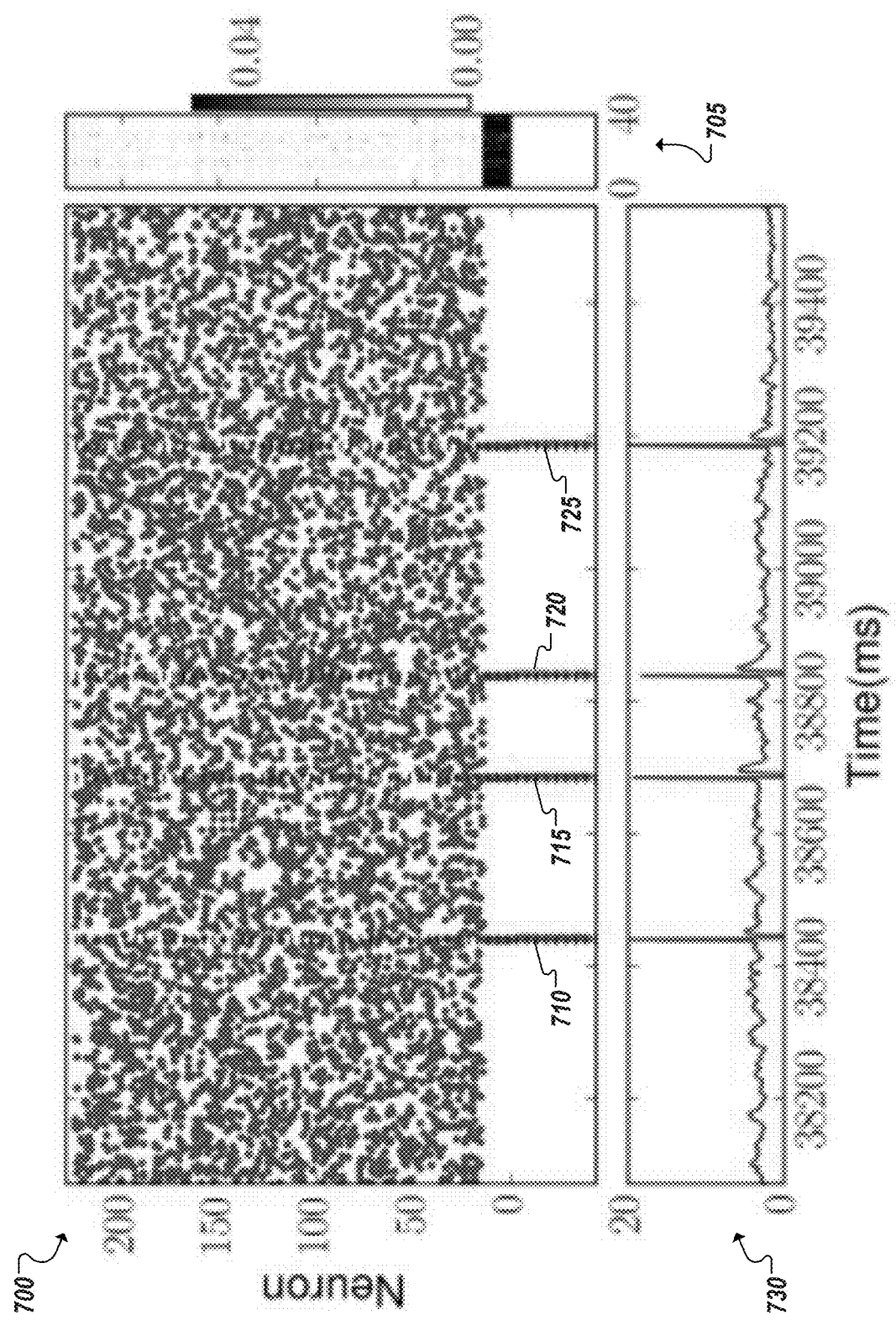
Figure 8:
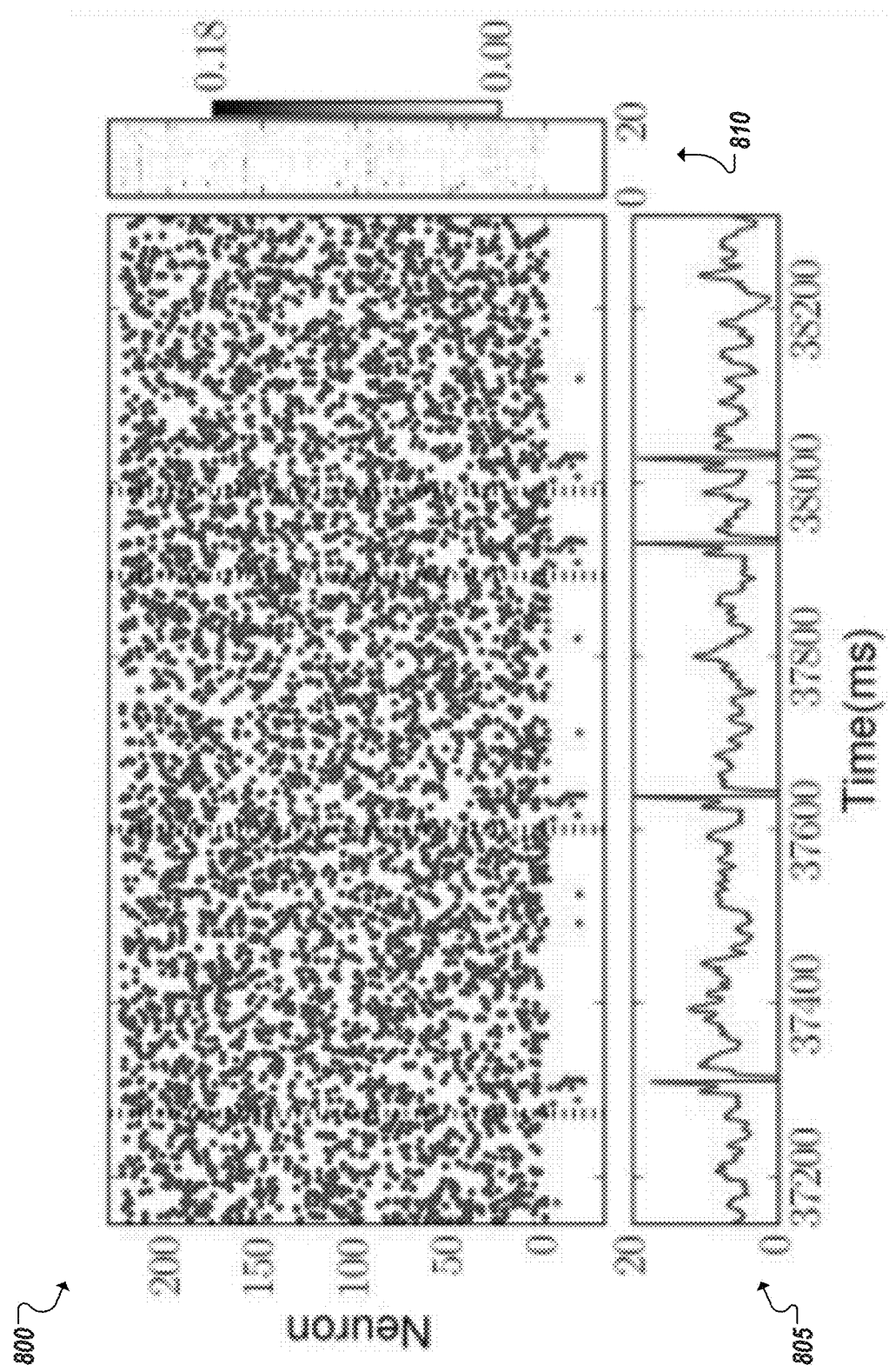

In the example of FIG. 7, input sources provided to the example SNN are firing synchronously. In this case, the learning rule is able to potentiate the corresponding synapses and depress all other synapses. In another example, shown in FIG. 8, a randomly generated fixed spike pattern "SP" is repeatedly presented to the SNN as inputs, interspersed with random spike patterns of the same firing rate. FIG. 8 shows the presentation 800 of the stream of such spikes to 20 different neurons over 225 synapses each. Further, the initial weights of the synapses are randomly initialized from a uniform distribution. Over time the synaptic weights converge such that the postsynaptic neurons selectively spike only on presentation of the spike pattern SP. It should be noted that not all neurons spike at the exact same time but fire in proximity to SP, as can also be explained from the different final weights. In one example, neurons of the SNN receive Poisson spike trains from 225 pre-synaptic neurons. A 40 ms spike pattern (SP) is repeatedly presented with a mean frequency of 5 Hz (onset marked by vertical dotted lines) interspersed with random Poisson spikes of varying lengths. In this example, both the spike pattern (SP) and random spikes have a mean spiking frequency of 20 Hz. After training with this input, the output neurons' response synchronizes with the presentation of SP as can be seen in the lower subplot 805. The final weights from the training are shown in the right sub-plot 810.

Figure 9:
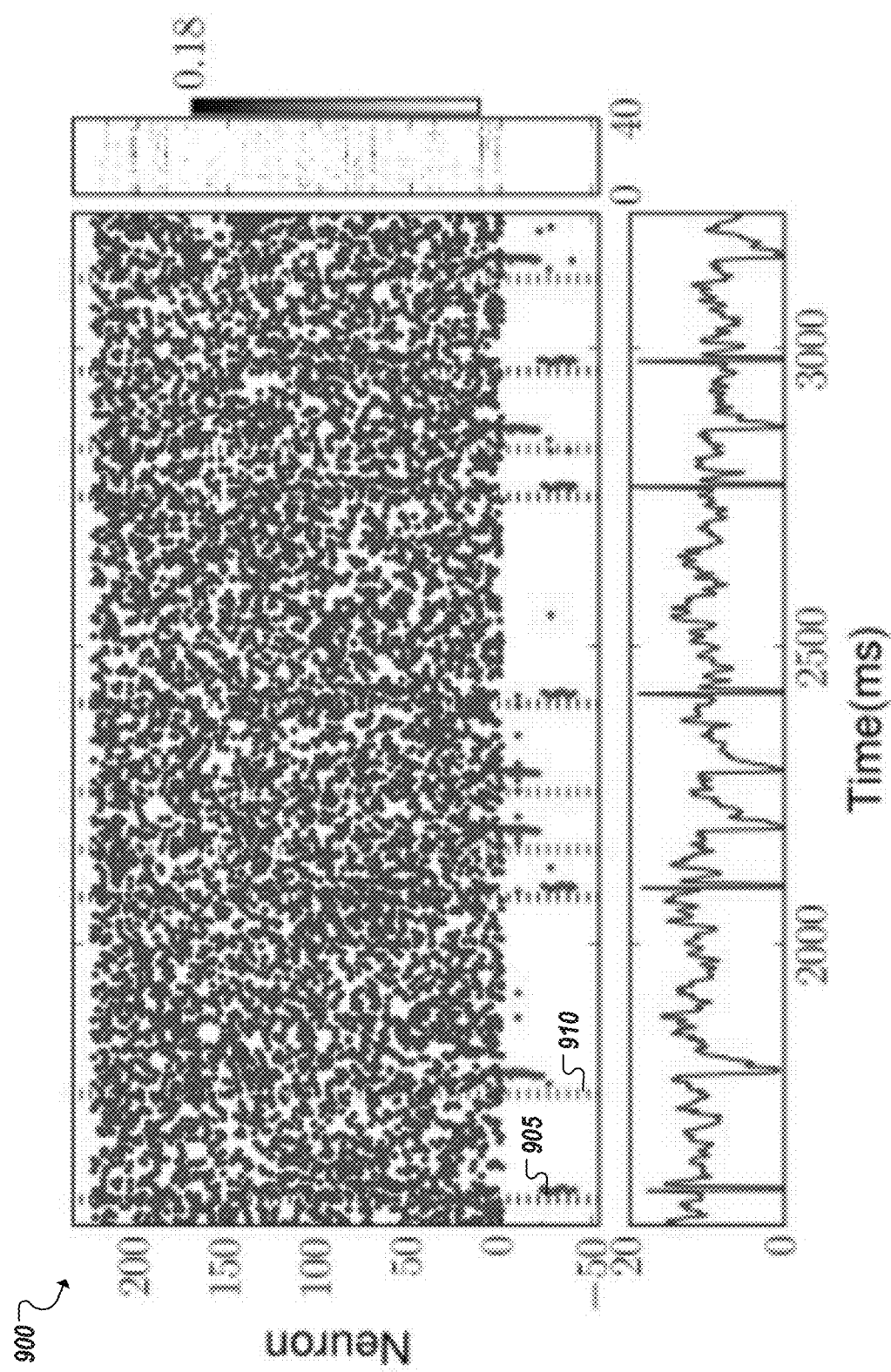

Turning to the example of FIG. 9, two different patterns (e.g., 905, 910) are provided as inputs to the SNN in random order interspersed with noise similar to the single pattern presentation experiment in the example of FIG. 9. In order to ensure each of the coincidence detectors are tuned to one of the patterns of interest, a competitive winner-take-all is imposed on the coincidence detector neurons. Two populations of 20 neurons each with self-excitatory connections and mutual inhibitory connections constitute this winner-take-all network of coincidence detectors. As shown in FIG. 9 the two populations indeed self-organize using the Vm-based learning rule to detect one of the two spike patterns. Such competition allows the populations to converge onto different spike patterns. The raster plot 900 shows the input and output spike trains of two competing populations of neurons used to identify two different spike patterns (onsets marked with vertical dotted lines) embedded in a noisy spike train.

Figure 10:
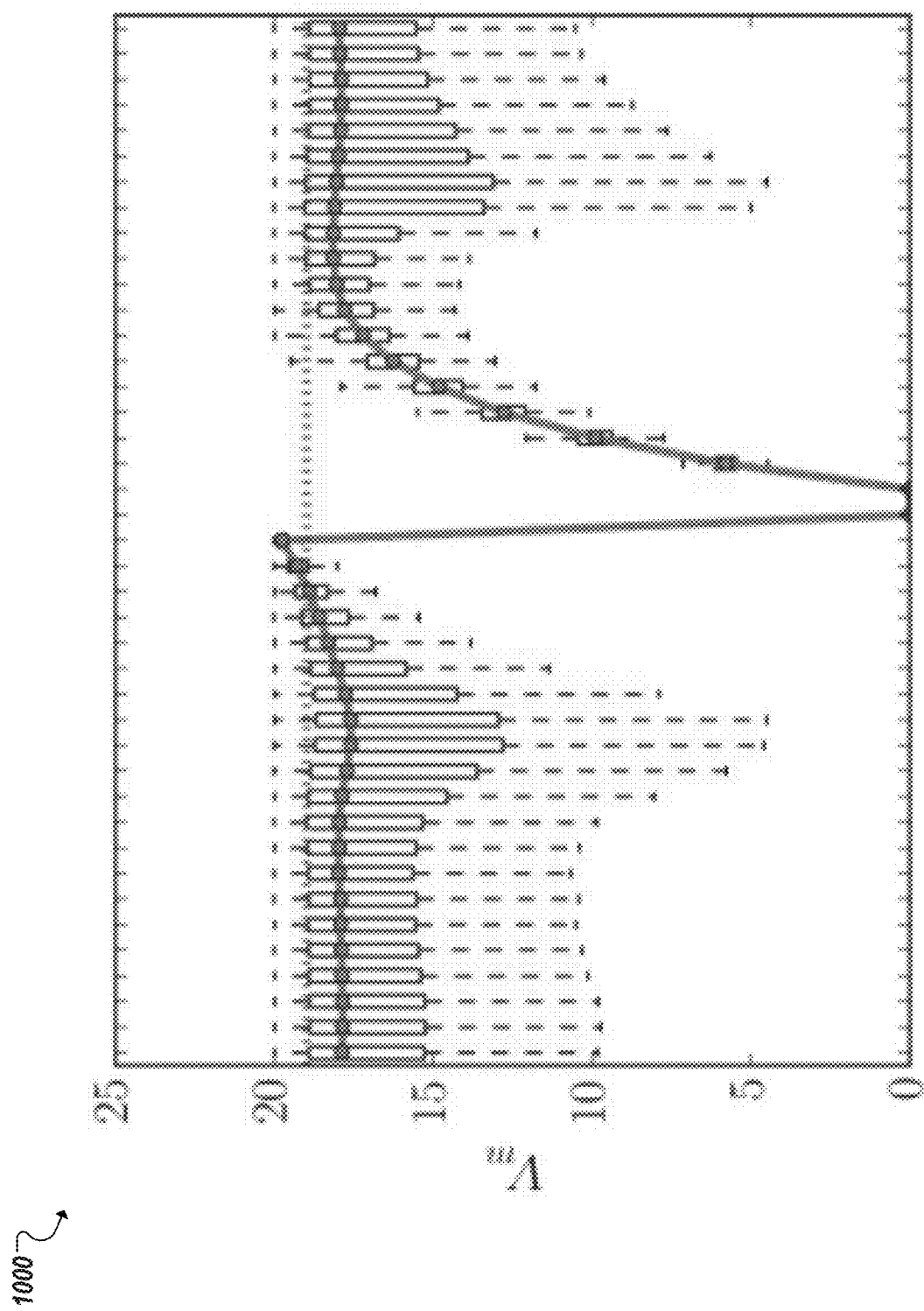
Figure 11:
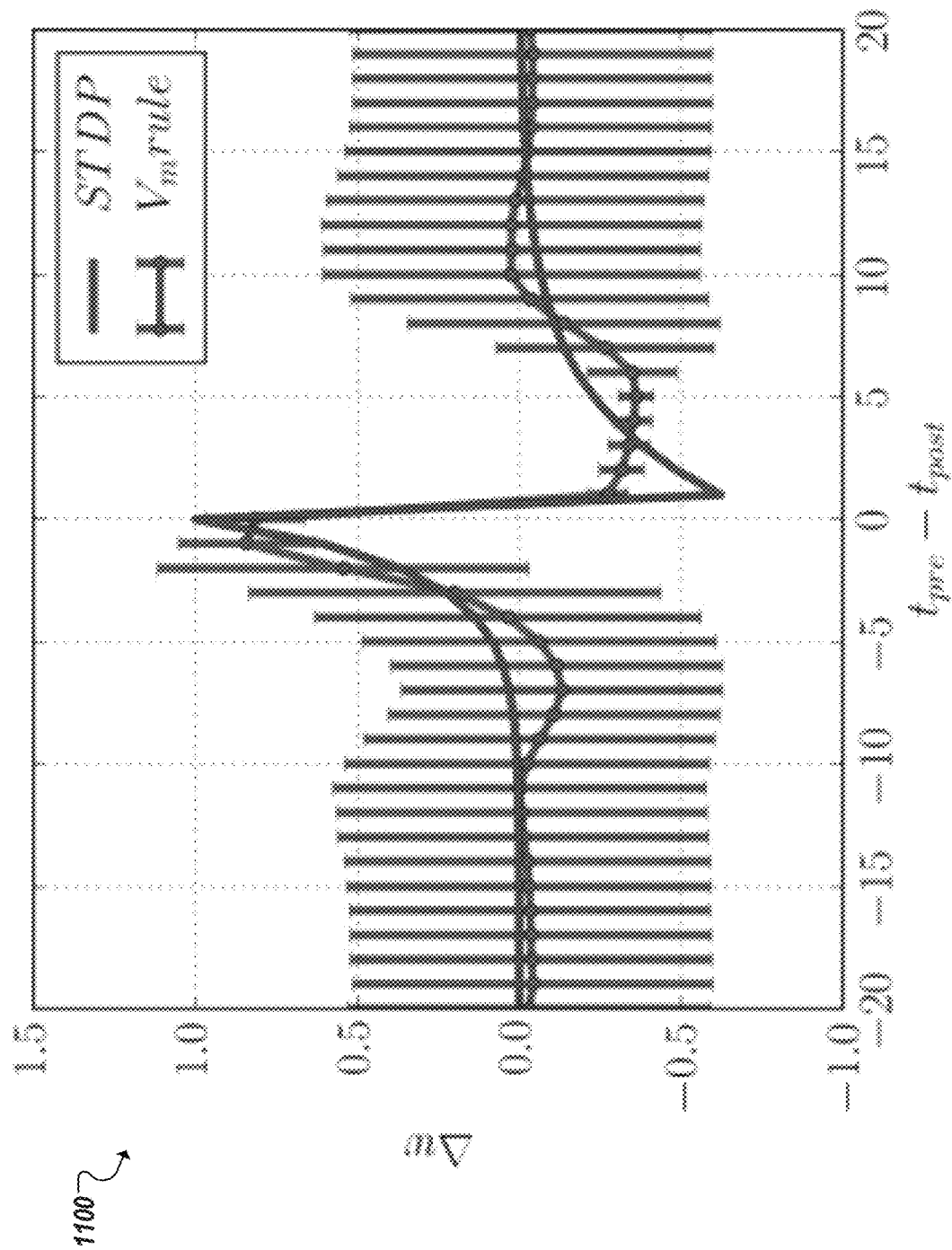

As discussed above, an improved Vm-base learning rule may functionally replicate the computational capabilities of pairwise STDP and be used in lieu of an STDP learning rule. To demonstrate, as shown in the example of FIGS. 10-11, an experiment is performed including a statistical measure of the weight updates triggered by the arrival of a pre-synaptic spike with respect to post-synaptic spike time (as with traditional STDP). In this example, a single post synaptic neuron was presented with random Poisson spike patterns across 225 synapses. While freezing all the weights, the hypothetical weight updates governed by the STDP learning rule were recorded over time. The recorded data was sorted with regard to post-synaptic spike timing. The membrane potential with regard to the spike timing of the postsynaptic neurons was also recorded for use in with the Vm-based learning rule. The plot 1000 of FIG. 10 shows the distribution of membrane potential approaching spiking threshold just before a postsynaptic spike, and is close to resting potential right after. In FIG. 11, the curve on the plot 1100 shows positive weight updates (LTP) when a presynaptic spike arrives just before the postsynaptic neuron fires and negative (LTD) when a presynaptic spike arrives just after the postsynaptic neuron fires. Beyond a certain time window, the mean weight update is zero, although individual updates have a large variance. As can be seen in FIG. 11, the membrane based learning rule proposed here empirically approximates the pairwise exponential STDP rule.

It should be appreciated that the examples and features discussed above are presented to illustrate broader principles herein. For instance, additional or alternative features may be applied without departing from the principles and systems discussed herein. For instance, while some of the examples discussed herein contemplated a single Vm potential threshold to be used in a Vm-based learning rule, other examples may utilize multiple potential thresholds (e.g., with different weight changes corresponding to exceeding each respective potential threshold. Indeed, implementations of a Vm-based learning rule may address issues arising in complex learning kernels to mimic other STDP kernels and optimize the learning processes.

Figure 12:
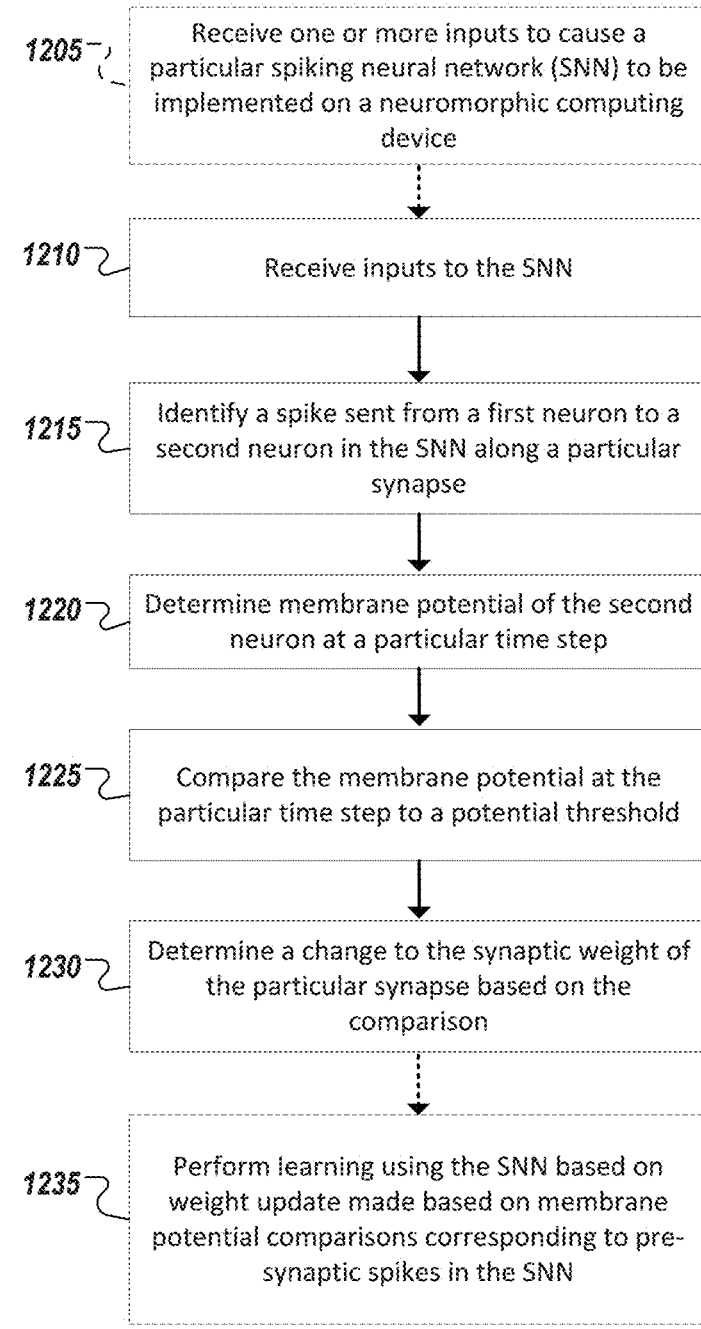
FIG. 12 is a flowchart illustrating an example technique to apply an example post-neuron-membrane-potential-based learning rule within an SNN.

FIG. 12 is a flowchart 1200 illustrating an example technique applying a Vm-based learning rule within an example SNN implemented in a neuromorphic computing device. For instance, a particular SNN may be implemented on the neuromorphic computing device from inputs received 1205 to define a collection of artificial neurons and their respective parameters as well as the artificial synapses interconnecting these artificial neurons. With the SNN defined and implemented, a set of inputs may be received 1210 at certain input neurons, which may result in spikes being generated by a subset of the neurons and propagated on synapses through the SNN. A particular spike may be identified 1215 that is sent from a first one of the artificial neurons to a second one of the artificial neurons on a particular synapse. The first neuron may represent the pre-neuron corresponding to the particular synapse and the second neuron may represent the post-neuron of the particular synapse. The membrane potential of the second neuron may be determine 1220 at a time step that corresponds to the sending of the particular spike. In some instance, the time step may correspond to the particular spike in that the time is the time step immediately following the time step in which the particular spike was sent. In other examples, the time step may be the same as the time step in which the particular spike was sent, among other examples. The membrane potential of the second neuron determined at the particular time step may be associated with the particular spike and serve as the basis of a learning rule defined within the SNN to adjust synaptic weight of the particular synapse to model plasticity of the synaptic weight. For instance, the membrane potential of the second neuron at the particular time step may be compared 1225 (e.g., using a comparator) with a defined threshold potential corresponding to the learning rule (which is at a value less than a firing threshold of the second neuron). A change to the synaptic weight of the particular synapse may be determined 1230 based on the comparison (at 1225), such that the synaptic weight is to change according to a first change if the membrane potential of the second neuron at the particular time step is less than the threshold potential or according to a second change if the second neuron's membrane potential at the particular time step is more than the threshold potential. For instance, the weight may be increased if the second neuron's membrane potential is more than the threshold potential and decreased if the membrane potential is less than the threshold potential, among other examples. Similar changes may be determined according to the Vm-based learning rule for any or all of the synapses defined in the SNN according to the respective post-neuron membrane potential measured in association with the sending of each spike in the SNN. Such a learning rule may serve as the basis for performing 1235 learning using the SNN. Indeed, the set of inputs received (at 1210) at the SNN may serve to train the SNN such that steady state weight values are determined for some or all of the synapses in the SNN and the trained SNN may be utilized to perform data classification and other machine learning tasks, among other example uses and features.

FIGS. 13-18 detail exemplary architectures and systems to implement embodiments of the above (such as the processors utilized in the neuromorphic computing device implementing the example SNNs described above). In some embodiments, one or more hardware components and/or instructions described above are emulated as detailed below, or implemented as software modules. Indeed, embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Figure 13:
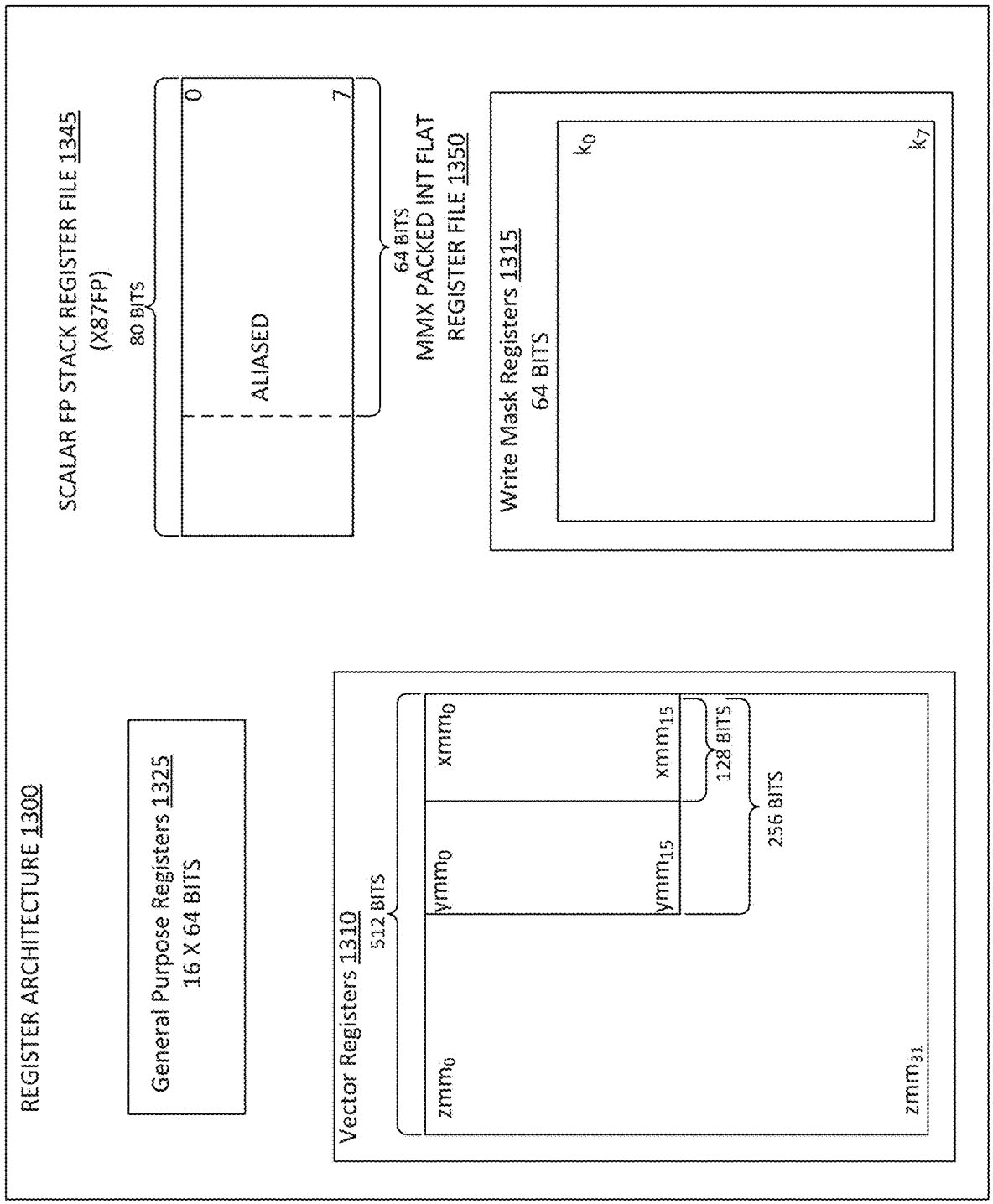
FIG. 13 is a block diagram of a register architecture according to one embodiment of the invention.

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

In other words, the vector length field selects between a maximum length and one or more other shorter lengths, where each such shorter length is half the length of the preceding length; and instructions templates without the vector length field operate on the maximum vector length. Further, in one embodiment, the class B instruction templates of the specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-14B illustrate the in-order pipeline and in-order core, while the optional addition of the dashed lined boxes illustrates the register renaming, out-oforder issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 15B:
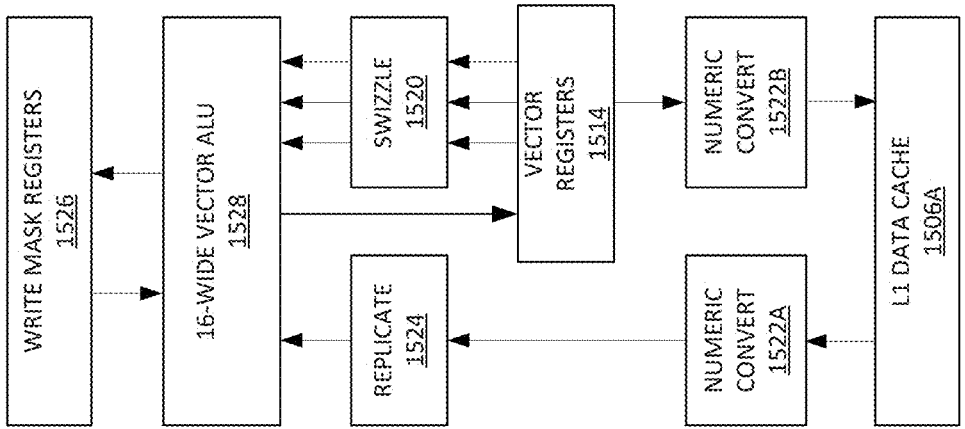
FIG. 15A-15B illustrate a block diagram of a more specific exemplary in-order core architecture, which core would be one of several logic blocks (including other cores of the same type and/or different types) in a chip.
Figure 15A:
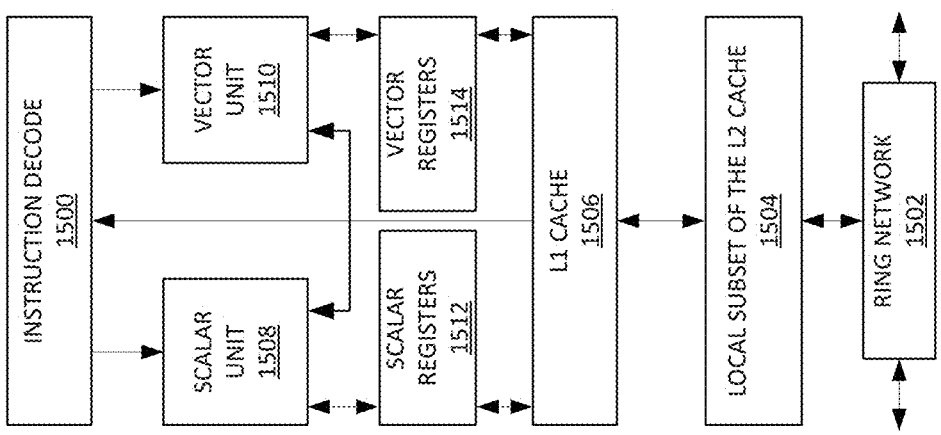

FIGS. 15A-15B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
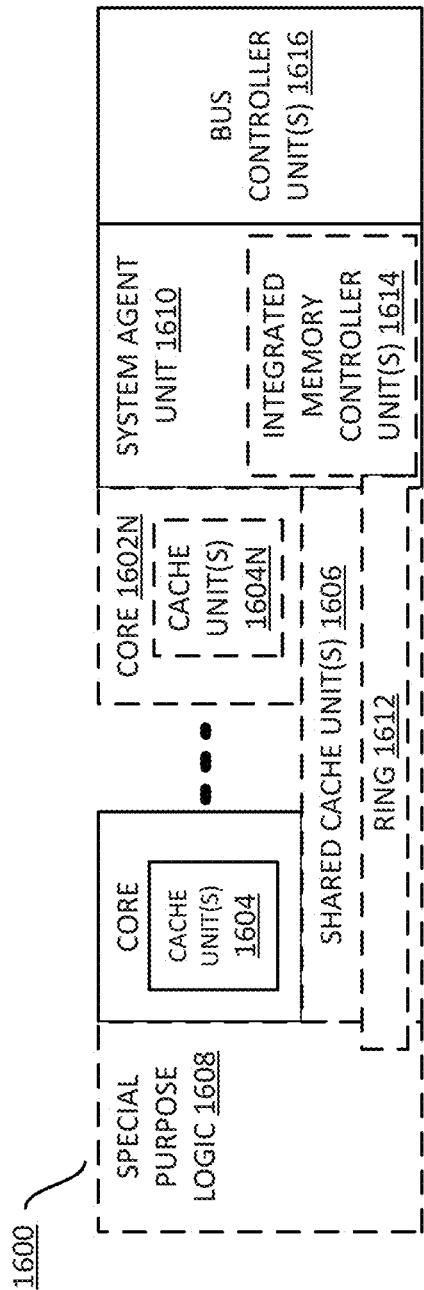
FIG. 16 is a block diagram of a processor that may have more than one core, may have an integrated memory controller, and may have integrated graphics according to embodiments of the invention.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
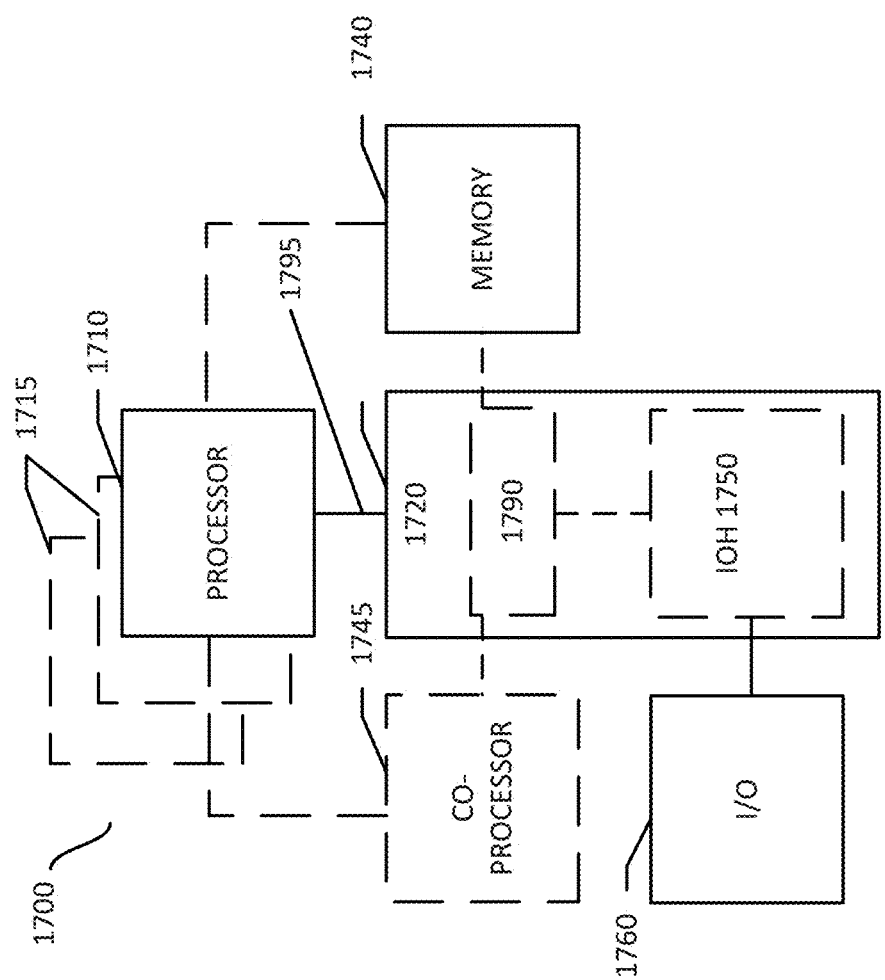
FIGS. 17-20 are block diagrams of exemplary computer architectures.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor (s) 1745 accept and execute the received coprocessor instructions.

Figure 18:
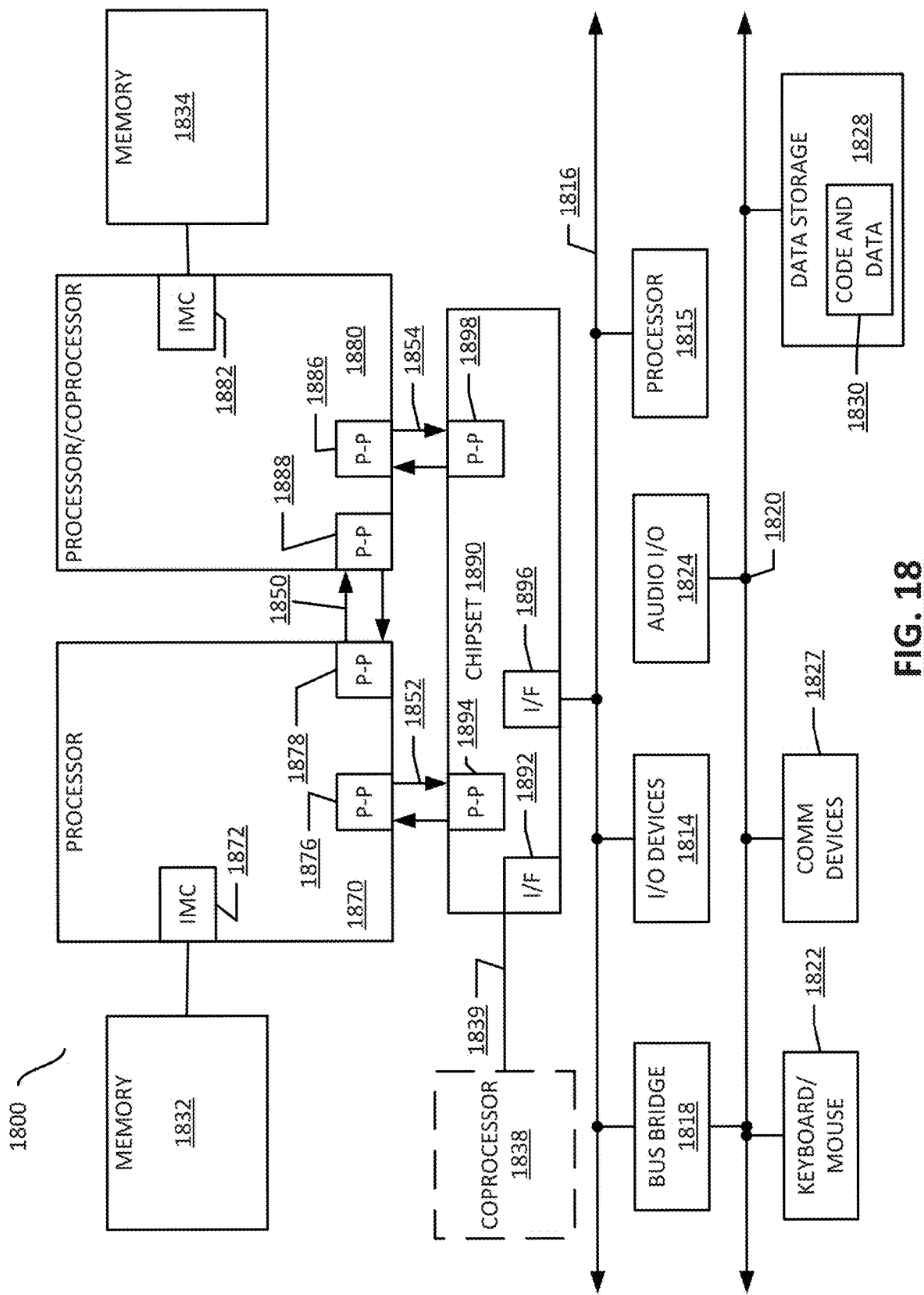

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
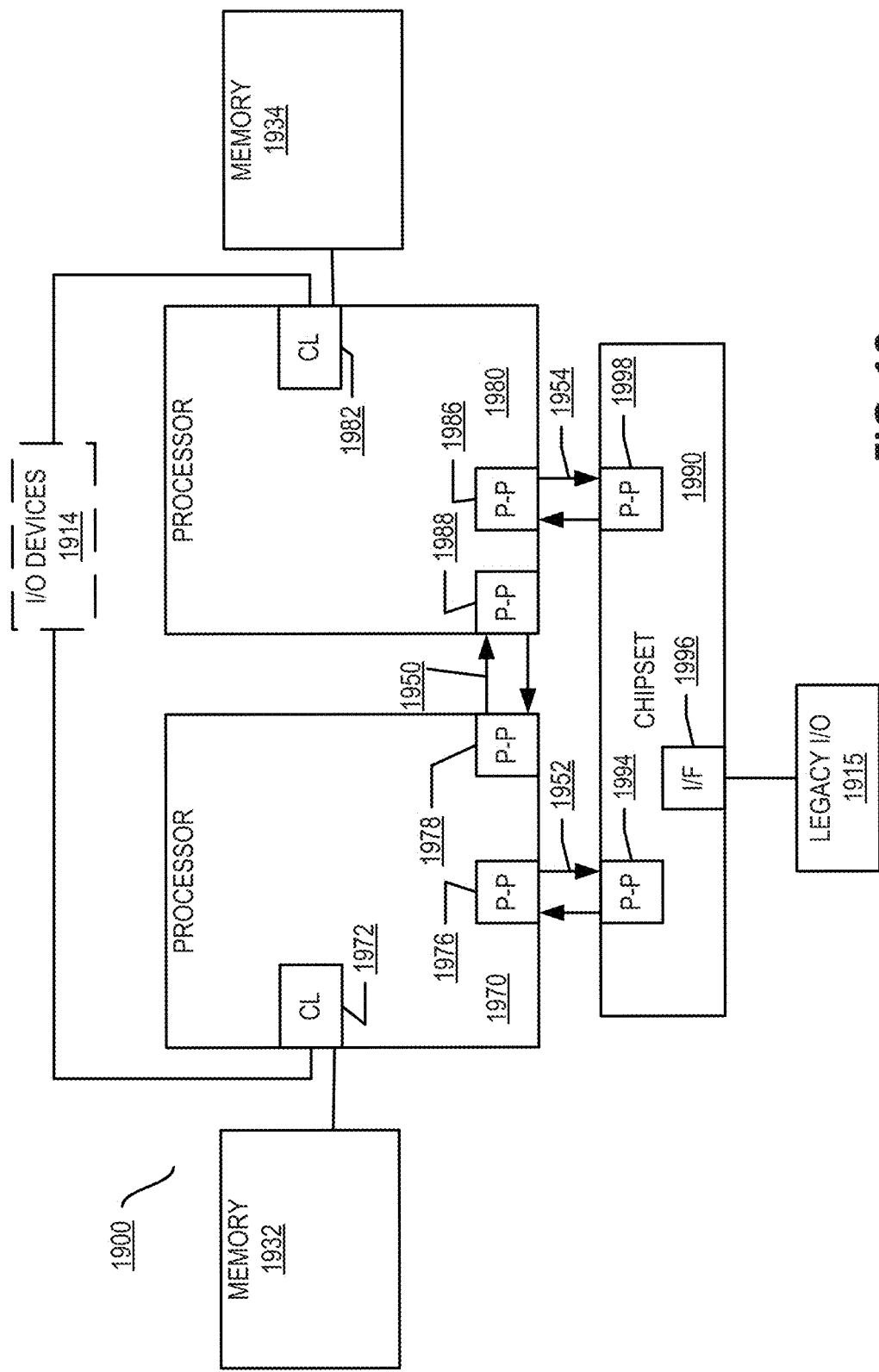

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
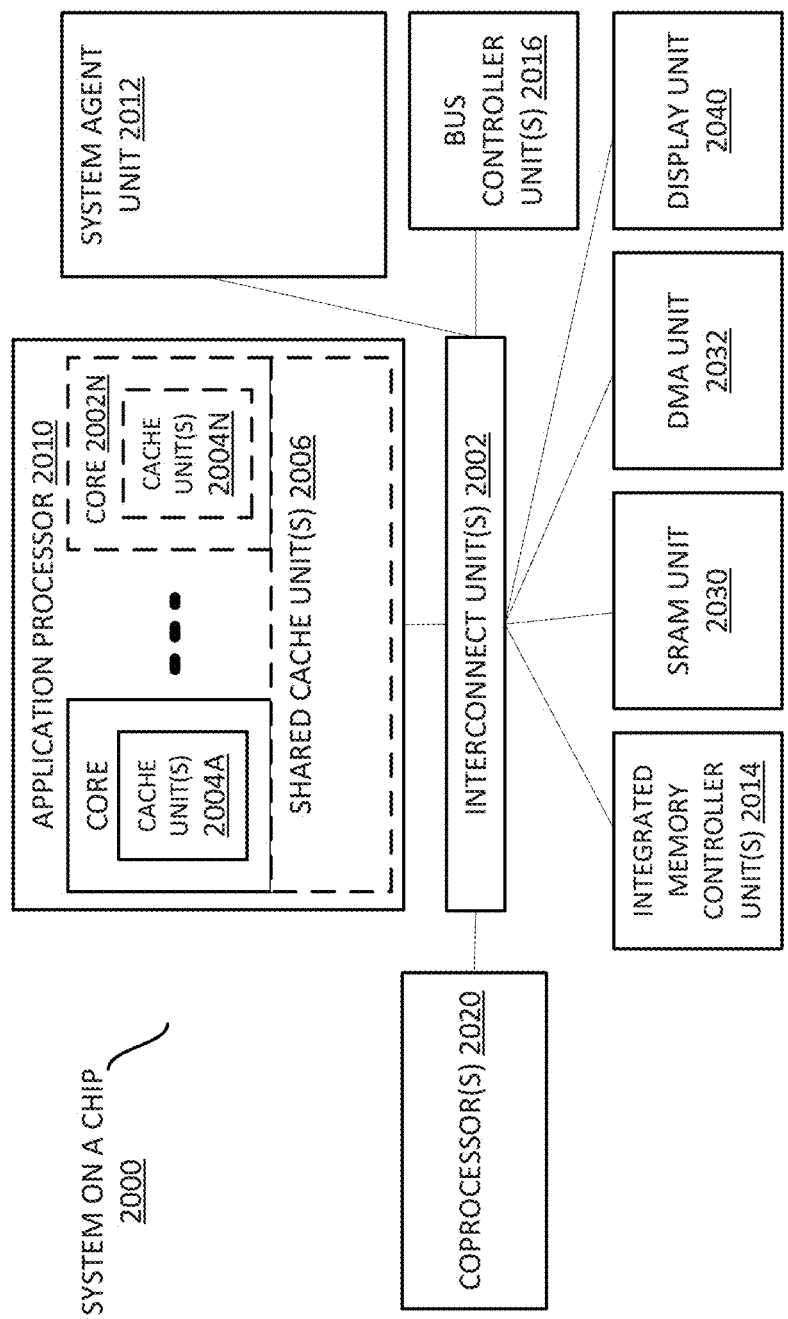

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 2020A-N and shared cache unit(s) 2006; a system agent unit 2012; a bus controller unit(s) 2016; an integrated memory controller unit(s) 2014; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
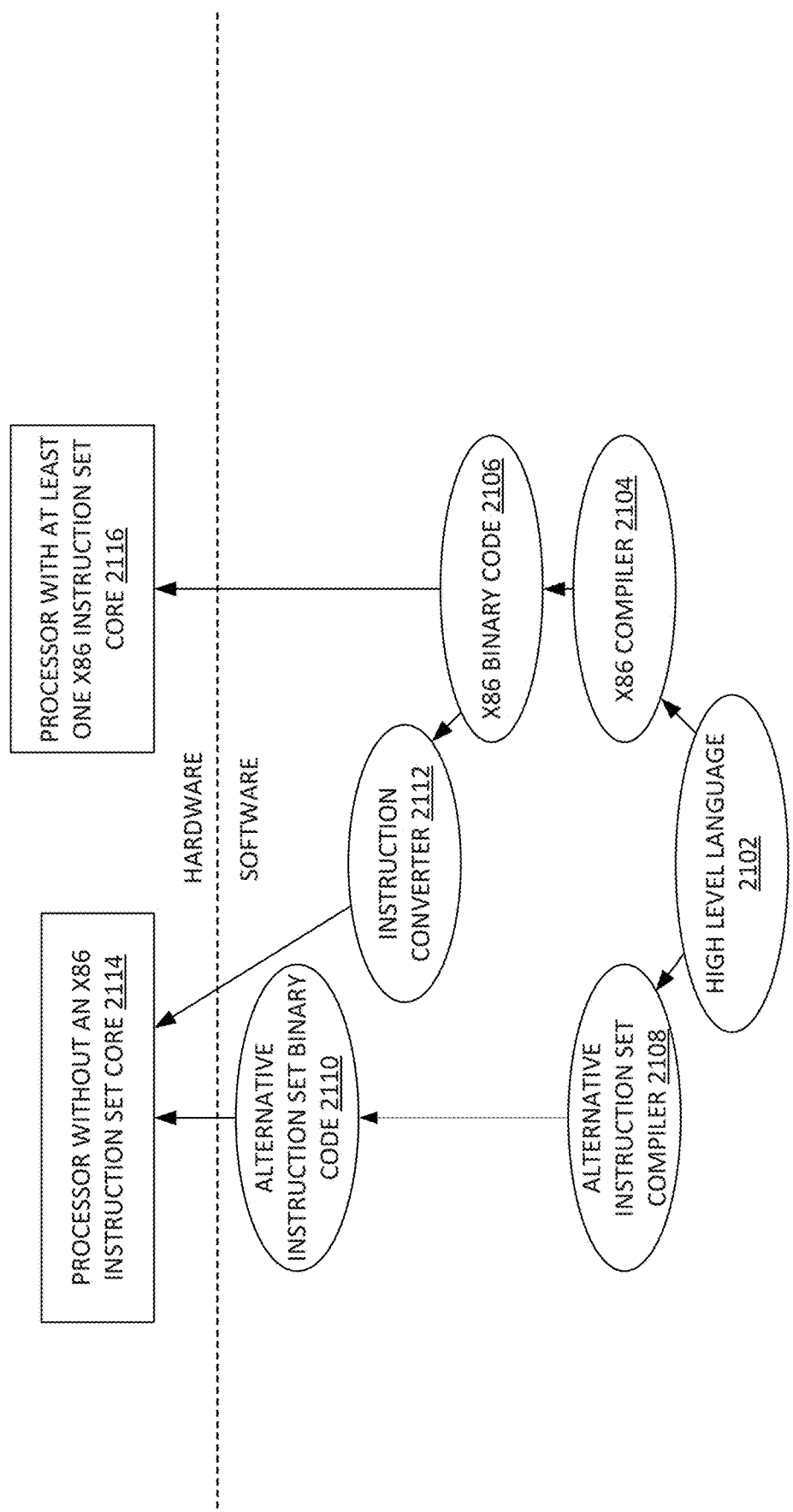
FIG. 21 is a block diagram contrasting the use of a software instruction converter to convert binary instructions in a source instruction set to binary instructions in a target instruction set according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, where the instructions when executed on a machine, cause the machine to: identify a spike sent from a first artificial neuron in a spiking neural network (SNN) to a second artificial neuron in the SNN, where the SNN is implemented using a neuromorphic computing device, and the spike is sent over a particular artificial synapse connecting the first artificial neuron to the second artificial neuron in the SNN; compare the membrane potential of the second artificial neuron at a particular time step, corresponding to sending of the spike, to a threshold potential, where the threshold potential is set lower than a firing potential of the second artificial neuron; and determine a change to synaptic weight of the particular artificial synapse based on the spike, where the synaptic weight is to be decreased if the membrane potential of the second artificial neuron is lower than the threshold potential at the particular time step and the synaptic weight is to be increased if the membrane potential of the second artificial neuron is higher than the threshold potential at the particular time step.

Example 2 may include the subject matter of example 1, where the instructions, when executed, further cause the machine to determine an amount of the change based on a degree to which the membrane potential of the second artificial neuron at the particular time step is higher or lower than the threshold potential.

Example 3 may include the subject matter of any one of examples 1-2, where the synaptic weight is to be increased if the membrane potential of the second artificial neuron at the particular time step is both above the threshold potential and below the firing potential.

Example 4 may include the subject matter of any one of examples 1-3, where the spike is sent in a first time step and the particular timestep includes a timestep immediately after the first time step.

Example 5 may include the subject matter of any one of examples e 1-4, where the instructions, when executed, further cause the machine to change the synaptic weight of the particular artificial synapse on the neuromorphic computing device based on the change.

Example 6 may include the subject matter of any one of examples 1-5, where the instructions, when executed, further cause the machine to provide a set of inputs to the SNN and train the SNN based on the set of inputs, where training includes changing the synaptic weight of the particular artificial synapse based on the spike.

Example 7 may include the subject matter of any one of examples 1-6, where the set of inputs includes a first set of inputs and the instructions, when executed, further cause the machine to provide a second set of inputs to the SNN and generate an output based on the SNN trained according to the first set of inputs.

Example 8 may include the subject matter of any one of examples 1-7, where the SNN includes a particular SNN and the neuromorphic computing device includes an interface to accept programming inputs to implement any one of a plurality of different spiking neural networks including the particular SNN.

Example 9 may include the subject matter of example 8, where defining the particular SNN includes: generating a plurality of artificial neurons including the first and second artificial neurons; defining artificial synapses to interconnect the plurality of artificial synapses, where the artificial synapses are defined in one or more routing tables; and setting synaptic weight values for each of the plurality of artificial synapses to respective initial synaptic weight values.

Example 10 may include the subject matter of any one of examples 8-9, where the neuromorphic computing device maintains respective membrane potential values for each of the plurality of artificial neurons and synaptic weights for each of the plurality of artificial synapses over a series of time steps including the particular time step.

Example 11 is a method including: identifying a spike sent from a first artificial neuron in a spiking neural network (SNN) to a second artificial neuron in the SNN, where the SNN is implemented using a neuromorphic computing device, and the spike is sent over a particular artificial synapse connecting the first artificial neuron to the second artificial neuron in the SNN; comparing the membrane potential of the second artificial neuron at a particular time step, corresponding to sending of the spike, to a threshold potential, where the threshold potential is set lower than a firing potential of the second artificial neuron; and determining a change to synaptic weight of the particular artificial synapse based on the spike, where the synaptic weight is to be decreased if the membrane potential of the second artificial neuron is lower than the threshold potential at the particular time step and the synaptic weight is to be increased if the membrane potential of the second artificial neuron is higher than the threshold potential at the particular time step.

Example 12 may include the subject matter of example 11, further including determining an amount of the change based on a degree to which the membrane potential of the second artificial neuron at the particular time step is higher or lower than the threshold potential.

Example 13 may include the subject matter of any one of examples 11-12, where the synaptic weight is to be increased if the membrane potential of the second artificial neuron at the particular time step is both above the threshold potential and below the firing potential.

Example 14 may include the subject matter of any one of examples 11-13, where the spike is sent in a first time step and the particular timestep includes a timestep immediately after the first time step.

Example 15 may include the subject matter of any one of examples 11-14, further including changing the synaptic weight of the particular artificial synapse on the neuromorphic computing device based on the change.

Example 16 may include the subject matter of any one of examples 11-15, further including providing a set of inputs to the SNN and train the SNN based on the set of inputs, where training includes changing the synaptic weight of the particular artificial synapse based on the spike.

Example 17 may include the subject matter of any one of examples 11-16, where the set of inputs includes a first set of inputs and the method further includes providing a second set of inputs to the SNN and generate an output based on the SNN trained according to the first set of inputs.

Example 18 may include the subject matter of any one of examples 11-17, where the SNN includes a particular SNN and the neuromorphic computing device includes an interface to accept programming inputs to implement any one of a plurality of different spiking neural networks including the particular SNN.

Example 19 may include the subject matter of example 18, where defining the particular SNN includes: generating a plurality of artificial neurons including the first and second artificial neurons; defining artificial synapses to interconnect the plurality of artificial synapses, where the artificial synapses are defined in one or more routing tables; and setting synaptic weight values for each of the plurality of artificial synapses to respective initial synaptic weight values.

Example 20 may include the subject matter of example 19, where the neuromorphic computing device maintains respective membrane potential values for each of the plurality of artificial neurons and synaptic weights for each of the plurality of artificial synapses over a series of time steps including the particular time step.

Example 21 is a system including means to perform the method of any one of examples 11-20.

Example 22 may include the subject matter of example 21, where the means include a neuromorphic computing device.

Example 23 may include the subject matter of example 22, where the neuromorphic computing device includes a network of hardware-implemented neuromorphic cores.

Example 24 is a system including: a neuromorphic computing device to implement an artificial spiking neural network (SNN), where the neuromorphic computing device includes: at least one neuromorphic core including: an interface to receive at least one input; and a learning core to: identify a spike sent from a first artificial neuron in the SNN to a second artificial neuron in the SNN over a particular artificial synapse connecting the first artificial neuron to the second artificial neuron in the SNN, where the spike corresponds to the input; compare the membrane potential of the second artificial neuron at a particular time step corresponding to the spike to a threshold potential, where the threshold potential is set lower than a firing potential of the second artificial neuron; and determine a change to synaptic weight of the particular artificial synapse based on the spike, where a first change to the synaptic weight is to be made if the membrane potential of the second artificial neuron is lower than the threshold potential at the particular time step and a second, different change to the synaptic weight is to be made if the membrane potential of the second artificial neuron is higher than the threshold potential at the particular time step.

Example 25 may include the subject matter of example 24, where the learning core includes at least one voltage comparator to compare the membrane potential of the second artificial neuron at a particular time step corresponding to the spike to a threshold potential.

Example 26 may include the subject matter of any one of examples 24-25, where the first change includes a decrease in the synaptic weight and second change includes an increase in the synaptic weight.

Example 27 may include the subject matter of any one of examples 24-26, where the neuromorphic core includes a particular neuromorphic core, and the neuromorphic computing device includes a plurality of neuromorphic cores and one or more routers to interconnect the plurality of neuromorphic cores.

Example 28 may include the subject matter of example 27, where the interface is to receive inputs from other neuromorphic cores in the plurality of neuromorphic cores and send outputs to other neuromorphic cores in the plurality of neuromorphic cores.

Example 29 may include the subject matter of example 28, where the interface is further to receive inputs from an input source system other than one of the plurality of neuromorphic cores.

Example 30 may include the subject matter of any one of examples 27-29, where the first artificial neuron is implemented on the particular neuromorphic core and the second artificial neuron is implemented on another one of the plurality of neuromorphic cores.

Example 31 may include the subject matter of any one of examples 24-30, where the neuromorphic core implements a plurality of artificial neurons in the SNN and the learning core determines changes to synaptic weights of a plurality of artificial synapses connecting the plurality of artificial neurons to other artificial neurons in the SNN.

Example 32 may include the subject matter of example 31, where the neuromorphic core further includes: synaptic weight memory to maintain synaptic weight values for each of the plurality of artificial synapses; and a neuron state module to maintain membrane potential values for each of the plurality of artificial neurons.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one machine accessible storage medium having instructions stored thereon, wherein the instructions when executed on a machine, cause the machine to:
   identify a spike sent from a first artificial neuron in a spiking neural network (SNN) to a second artificial neuron in the SNN, wherein the SNN is implemented using a neuromorphic computing device, the neuromorphic computing device comprises a plurality of neuromorphic cores to model artificial neurons in the SNN and one or more routers to interconnect the plurality of neuromorphic cores, and the spike is sent over a particular artificial synapse defined using the router and connecting the first artificial neuron to the second artificial neuron in the SNN;
   compare membrane potential of the second artificial neuron at a particular timestep, corresponding to sending of the spike, to a threshold potential, wherein the threshold potential is set lower than a firing potential of the second artificial neuron; and
   determine a change to synaptic weight of the particular artificial synapse based on the spike, wherein the synaptic weight is to be decreased if the membrane potential of the second artificial neuron is lower than the threshold potential at the particular timestep and the synaptic weight is to be increased if the membrane potential of the second artificial neuron is higher than the threshold potential at the particular timestep.

2. The storage medium of claim 1, wherein the instructions, when executed, further cause the machine to determine an amount of the change based on a degree to which the membrane potential of the second artificial neuron at the particular timestep is higher or lower than the threshold potential.

3. The storage medium of claim 1, wherein the synaptic weight is to be increased if the membrane potential of the second artificial neuron at the particular timestep is both above the threshold potential and below the firing potential.

4. The storage medium of claim 1, wherein the spike is sent in a first timestep and the particular timestep comprises a timestep immediately after the first timestep.

5. The storage medium of claim 1, wherein the instructions, when executed, further cause the machine to change the synaptic weight of the particular artificial synapse on the neuromorphic computing device based on the change.

6. The storage medium of claim 1, wherein the instructions, when executed, further cause the machine to provide a set of inputs to the SNN and train the SNN based on the set of inputs, wherein training comprises changing the synaptic weight of the particular artificial synapse based on the spike.

7. The storage medium of claim 1, wherein the set of inputs comprises a first set of inputs and the instructions, when executed, further cause the machine to provide a second set of inputs to the SNN and generate an output based on the SNN trained according to the first set of inputs.

8. The storage medium of claim 1, wherein the SNN comprises a particular SNN and the neuromorphic computing device comprises an interface to accept programming inputs to implement any one of a plurality of different spiking neural networks comprising the particular SNN.

9. The storage medium of claim 8, wherein defining the particular SNN comprises:
   generating a plurality of artificial neurons comprising the first and second artificial neurons;
   defining artificial synapses to interconnect the plurality of artificial synapses, wherein the artificial synapses are defined in one or more routing tables; and
   setting synaptic weight values for each of the plurality of artificial synapses to respective initial synaptic weight values.

10. The storage medium of claim 9, wherein the neuromorphic computing device maintains respective membrane potential values for each of the plurality of artificial neurons and synaptic weights for each of the plurality of artificial synapses over a series of timesteps comprising the particular timestep.

11. A method comprising:
   identifying a spike sent from a first artificial neuron in a spiking neural network (SNN) to a second artificial neuron in the SNN, wherein the SNN is implemented using a neuromorphic computing device, the neuromorphic computing device comprises a plurality of neuromorphic cores to model artificial neurons in the SNN and one or more routers to interconnect the plurality of neuromorphic cores, and the spike is sent over a particular artificial synapse defined using the router and connecting the first artificial neuron to the second artificial neuron in the SNN;
   comparing membrane potential of the second artificial neuron at a particular timestep, corresponding to sending of the spike, to a threshold potential, wherein the threshold potential is set lower than a firing potential of the second artificial neuron; and
   determining a change to synaptic weight of the particular artificial synapse based on the spike, wherein the synaptic weight is to be decreased if the membrane potential of the second artificial neuron is lower than the threshold potential at the particular timestep and the synaptic weight is to be increased if the membrane potential of the second artificial neuron is higher than the threshold potential at the particular timestep.

12. A system comprising:
   a neuromorphic computing device to implement an artificial spiking neural network (SNN), wherein the neuromorphic computing device comprises:
      a plurality of neuromorphic cores to model artificial neurons in the SNN and one or more routers to interconnect the plurality of neuromorphic cores, wherein each of the plurality of neuromorphic cores comprises:
         a respective interface to receive at least one input; and
         a respective learning core to:
            identify a spike sent from a first artificial neuron in the SNN to a second artificial neuron in the SNN over a particular artificial synapse connecting the first artificial neuron to the second artificial neuron in the SNN, wherein the spike corresponds to the input;
            compare membrane potential of the second artificial neuron at a particular timestep corresponding to the spike to a threshold potential, wherein the threshold potential is set lower than a firing potential of the second artificial neuron; and
            determine a change to synaptic weight of the particular artificial synapse based on the spike, wherein a first change to the synaptic weight is to be made if the membrane potential of the second artificial neuron is lower than the threshold potential at the particular timestep and a second, different change to the synaptic weight is to be made if the membrane potential of the second artificial neuron is higher than the threshold potential at the particular timestep.

13. The system of claim 12, wherein the learning core comprises at least one voltage comparator to compare the membrane potential of the second artificial neuron at a particular timestep corresponding to the spike to a threshold potential.

14. The system of claim 12, wherein the first change comprises a decrease in the synaptic weight and second change comprises an increase in the synaptic weight.

15. The system of claim 12, wherein the interface is to receive inputs from other neuromorphic cores in the plurality of neuromorphic cores and send outputs to other neuromorphic cores in the plurality of neuromorphic cores.

16. The system of claim 15, wherein the interface is further to receive inputs from an input source system other than one of the plurality of neuromorphic cores.

17. The system of claim 12, wherein the first artificial neuron is implemented on the particular neuromorphic core and the second artificial neuron is implemented on another one of the plurality of neuromorphic cores.

18. The system of claim 12, wherein the neuromorphic core implements a plurality of artificial neurons in the SNN and the learning core determines changes to synaptic weights of a plurality of artificial synapses connecting the plurality of artificial neurons to other artificial neurons in the SNN.

19. The system of claim 18, wherein the neuromorphic core further comprises:

synaptic weight memory to maintain synaptic weight values for each of the plurality of artificial synapses; and a neuron state module to maintain membrane potential values for each of the plurality of artificial neurons.

* * * * *